(12) United States Patent
Maruyama

(10) Patent No.: US 10,708,047 B2
(45) Date of Patent: Jul. 7, 2020

(54) COMPUTER-READABLE RECORDING MEDIUM STORING UPDATE PROGRAM AND UPDATE METHOD, AND COMPUTER-READABLE RECORDING MEDIUM STORING MANAGEMENT PROGRAM AND MANAGEMENT METHOD

(71) Applicant: FUJITSU LIMITED, Kawasaki-shi, Kanagawa (JP)

(72) Inventor: Hidefumi Maruyama, Mishima (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 417 days.

(21) Appl. No.: 15/377,374

(22) Filed: Dec. 13, 2016

(65) Prior Publication Data

US 2017/0093570 A1    Mar. 30, 2017

Related U.S. Application Data

(63) Continuation of application No. PCT/JP2014/065903, filed on Jun. 16, 2014.

(51) Int. Cl.
*H04L 9/08* (2006.01)
*H04L 29/06* (2006.01)
(Continued)

(52) U.S. Cl.
CPC ............ *H04L 9/0891* (2013.01); *H04L 9/006* (2013.01); *H04L 9/3247* (2013.01); *H04L 9/3268* (2013.01); *H04L 63/045* (2013.01); *H04L 63/0428* (2013.01); *H04L 63/062* (2013.01); *H04L 63/0823* (2013.01); *H04L 63/0869* (2013.01); *H04L 63/126* (2013.01); *H04L 2463/062* (2013.01)

(58) Field of Classification Search
None
See application file for complete search history.

(56) References Cited

U.S. PATENT DOCUMENTS 5,657,390 A    8/1997 Elgamal et al.
7,822,976 B2 * 10/2010 Hu .................. H04L 9/321
                                                            713/158
(Continued)

FOREIGN PATENT DOCUMENTS

JP     2001-111538     4/2001
JP     2001-320356     11/2001
(Continued)

OTHER PUBLICATIONS

Patent Abstracts of Japan, Publication No. 2006-60779, published Mar. 2, 2006.
(Continued)

*Primary Examiner* — Christopher A Revak
(74) *Attorney, Agent, or Firm* — Staas & Halsey LLP

(57) ABSTRACT

A computer-readable recording medium storing an update program is disclosed. An issuing request of a second public key certificate is sent to a server under a secure connection to the server using a first public key certificate. The second public key certificate is received from the server. A connection confirmation using the second public key certificate is conducted, when a validity date of the first public key certificate lapses.

13 Claims, 22 Drawing Sheets

(51) Int. Cl.
H04L 9/00 (2006.01)
H04L 9/32 (2006.01)

(56) References Cited

U.S. PATENT DOCUMENTS

| | | | | |
|---|---|---|---|---|
| 8,015,399 | B2* | 9/2011 | Imai | G06F 21/445 380/258 |
| 8,195,945 | B2* | 6/2012 | Andersson | G06F 21/575 713/175 |
| 8,745,377 | B2* | 6/2014 | Satoh | H04L 9/3268 713/156 |
| 8,762,710 | B2* | 6/2014 | Liang | H04L 63/0823 713/158 |
| 8,966,260 | B1* | 2/2015 | Walter | H04L 63/08 713/156 |
| 2001/0034834 | A1 | 10/2001 | Matsuyama et al. | |
| 2006/0020782 | A1 | 1/2006 | Kakii | |
| 2006/0047950 | A1 | 3/2006 | Thayer | |
| 2008/0091952 | A1* | 4/2008 | Sumner | H04L 63/064 713/185 |
| 2010/0115266 | A1* | 5/2010 | Guo | H04L 9/006 713/156 |
| 2010/0115267 | A1* | 5/2010 | Guo | H04L 63/0823 713/156 |
| 2010/0142410 | A1* | 6/2010 | Huynh Van | H04L 12/4633 370/255 |
| 2011/0154027 | A1* | 6/2011 | Liu | H04L 63/0823 713/158 |
| 2013/0238895 | A1* | 9/2013 | Dixon | H04L 9/0825 713/156 |
| 2014/0149740 | A1* | 5/2014 | Sato | H04L 9/006 713/158 |
| 2014/0379596 | A1* | 12/2014 | Pruss | G06F 21/105 705/318 |
| 2015/0271171 | A1* | 9/2015 | Rakshit | H04L 63/0823 726/10 |
| 2015/0341342 | A1* | 11/2015 | Klieman | H04L 63/0823 713/158 |

FOREIGN PATENT DOCUMENTS

| | | |
|---|---|---|
| JP | 2002-297548 | 10/2002 |
| JP | 2004-23224 | 1/2004 |
| JP | 2005-204144 | 7/2005 |
| JP | 2006-60779 | 3/2006 |
| JP | 2007-329731 | 12/2007 |
| JP | 2008-160384 | 7/2008 |
| JP | 2009-118350 | 5/2009 |

OTHER PUBLICATIONS

Espacenet Bibliographic Data, Japanese Publication No. 2004-23224, published Jan. 22, 2004.
Espacenet Bibliographic Data, Japanese Publication No. 2005-204144, published Jul. 28, 2005.
Patent Abstracts of Japan, Publication No. 2009-1118350, published May 28, 2009.
Patent Abstracts of Japan, Publication No. 2008-160384, published Jul. 10, 2008.
Patent Abstracts of Japan, Publication No. 2007-329731, published Dec. 20, 2007.
International Search Report dated Nov. 11, 2014 in corresponding International Application No. PCT/JP2014/065903.
Written Opinion of the International Searching Authority dated Nov. 11, 2014 in corresponding International Application No. PCT/JP2014/065903.
Shiho Moriai, "Security Protocols for the Internet", The Journal of the Institute of Image Information and Television Engineers, vol. 59, No. 4, Apr. 1, 2005, pp. 532-537.
Office Action for corresponding Japanese Patent Application No. 2016-528666, dated Feb. 20, 2018.
Hidetaka Aizawa et al., "Cryptography and Patent," IMES Discussion Paper Series, Institute for Monetary and Economic Studies, Bank of Japan, No. 98-J-9, pp. 34-36, 79-82, Jun. 1998.
Patent Abstracts of Japan English abstract for Japanese Patent Publication No. 2001-320356, published Nov. 16, 2001.
Patent Abstracts of Japan English abstract for Japanese Patent Publication No. 2002-297548, published Oct. 11, 2002.
Patent Abstracts of Japan English abstract for Japanese Patent Publication No. 2001-111538, published Apr. 20, 2001.
Japanese Office Action dated Jan. 8, 2019 in corresponding Japanese Patent Application No. 2016-528666.

* cited by examiner

FIG.10

CERTIFICATE MANAGEMENT INFORMATION TABLE
60

| ITEM | DETAILS |
|---|---|
| ELEMENT NUMBER | No. |
| CERTIFICATE ID | CERTIFICATE PUBLISHER ID + CERTIFICATE SERIAL NUMBER |
| CURRENT FLAG | 1: CURRENT GENERATION<br>0: UNUSED GENERATION<br>INITIAL VALUE: 0 |
| KEY TYPE | E: ELLIPTIC CURVE CRYPTOGRAPHY<br>R: RSA |
| KEY LENGTH | BIT LENGTH |
| PUBLIC KEY | VALUE OF PUBLIC KEY (BINARY) |
| PRIVATE KEY | VALUE OF PRIVATE KEY (BINARY) |
| NEXT GENERATION CERTIFICATE ELEMENT NUMBER | ELEMENT NUMBER OF NEXT GENERATION CLIENT PUBLIC KEY CERTIFICATE |
| PREVIOUS GENERATION CERTIFICATE ELEMENT NUMBER | ELEMENT NUMBER OF PREVIOUS GENERATION CLIENT PUBLIC KEY CERTIFICATE |
| VALIDITY DATE | YYYYMMDD:hhmmss(UTC) |
| CLIENT PUBLIC KEY CERTIFICATE | BINARY OF X.509 STANDARD CERTIFICATE |
| ... | ... |

NEXT GENERATION CLIENT PUBLIC KEY CERTIFICATE

PREVIOUS GENERATION CLIENT PUBLIC KEY CERTIFICATE

FIG.12

CERTIFICATE MANAGEMENT INFORMATION TABLE
80

| ITEM | DETAILS |
|---|---|
| ELEMENT NUMBER | No. |
| CERTIFICATE ID | CERTIFICATE PUBLISHER ID + CERTIFICATE SERIAL NUMBER |
| CURRENT GENERATION CERTIFICATE FLAG | 1: CURRENT GENERATION CLIENT PUBLIC KEY CERTIFICATE<br>0: UNUSED GENERATION<br>INITIAL VALUE: 0 |
| RECEIVED COUNT | TOTAL RECEIVED COUNT OF REQUESTS INDICATING NEXT GENERATION CLIENT PUBLIC KEY CERTIFICATE FROM CLIENT TERMINAL |
| TRANSMISSION COUNT PRIOR REPLY COMPLETION | COUNT OF RECEIVING ISSUANCE APPLICATION OF NEXT GENERATION CLIENT PUBLIC KEY CERTIFICATE FROM CLIENT |
| PUBLIC KEY | VALUE OF PUBLIC KEY (BINARY) |
| PRIVATE KEY | VALUE OF PRIVATE KEY (BINARY) |
| NEXT GENERATION CERTIFICATE ELEMENT NUMBER | ELEMENT NUMBER OF NEXT GENERATION CLIENT CERTIFICATE |
| PREVIOUS GENERATION CERTIFICATE ELEMENT NUMBER | ELEMENT NUMBER OF PREVIOUS GENERATION CLIENT CERTIFICATE |
| VALIDITY DATE | YYYYMMDD:hhmmss(UTC) |
| CLIENT PUBLIC KEY CERTIFICATE | BINARY OF X.509 STANDARD CERTIFICATE |
| ... | ... |

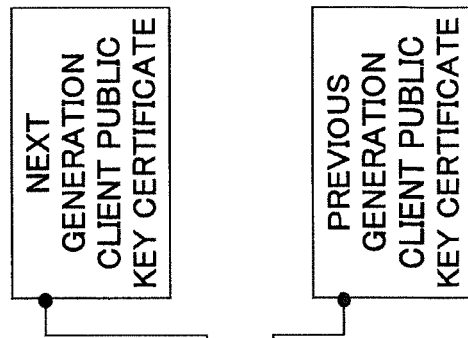

NEXT GENERATION CLIENT PUBLIC KEY CERTIFICATE

PREVIOUS GENERATION CLIENT PUBLIC KEY CERTIFICATE

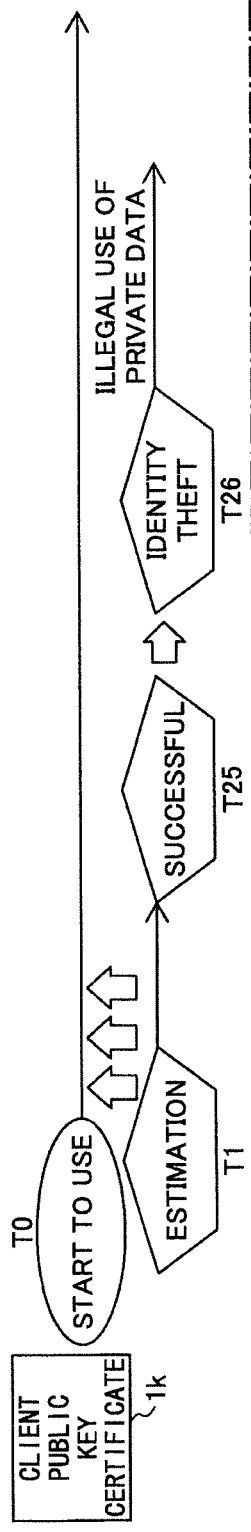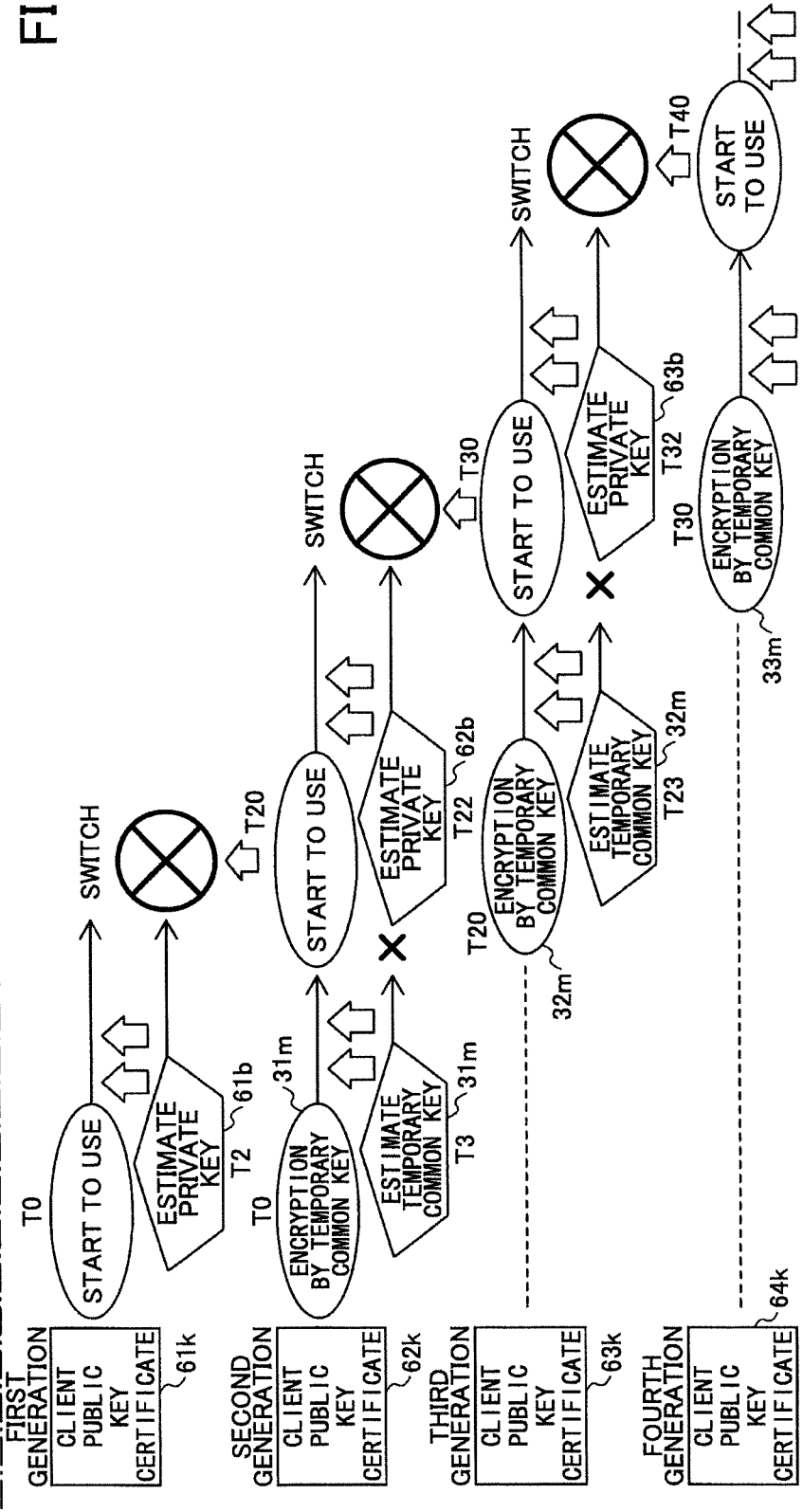

COMPUTER-READABLE RECORDING MEDIUM STORING UPDATE PROGRAM AND UPDATE METHOD, AND COMPUTER-READABLE RECORDING MEDIUM STORING MANAGEMENT PROGRAM AND MANAGEMENT METHOD

CROSS-REFERENCE TO RELATED APPLICATIONS

This application is a continuation application of International Application PCT/JP2014/065903 filed on Jun. 16, 2014 and designated the U.S., the entire contents of which are incorporated herein by reference.

FIELD

The embodiment discussed herein is related to a secure communication technology.

BACKGROUND

Recently, in order to securely conduct data communications through the Internet or the like, generally, a key estimation is prevented by applying a temporary key to secret data. Alternatively, data are encrypted by using a public key.

In a secure communication method using a public key encryption, a public key certificate for verifying an electronic signature of a request originator to be added to send data is first transmitted from a data request originator to a data request destination. A validity of the public key certificate is checked at a request destination. After that, a signature of data received from the data request originator is checked by using the public key in the public key certificate. It is checked whether the received data are created by a valid request originator.

However, the same public key certificate for verifying the signature of data has been always used unless a specific key pair (the public key and a private key) for the data request originator. If the third party spends a certain length of time, it becomes highly possible to estimate the private key corresponding to the public key. In a case of estimating the private key, an identity theft of a client terminal of the data request originator may be allowed. Hence, the data may be illegally used or may be altered.

In order to update a key pair (the public key and the private key), a technology is provided. When a communication session is opened between a client terminal and a server, after the public key certificate is mutually authenticated at both parties, a validity of a temporary public key is mutually confirmed with respect to the temporary public key mutually created at the both parties by verifying the signature by the public key in the public key certificate received from another party. A temporary key pair of the temporary public key received from another party and a temporary private key is shared by both parties. Communication data are encrypted and decrypted by using the shared temporary key pair.

PATENT DOCUMENTS

U.S. Pat. No. 5,657,390
Japanese Laid-open Patent Publication No. 2004-23224
Japanese Laid-open Patent Publication No. 2005-204144

SUMMARY

According to one aspect of the embodiment, there is provided a non-transitory computer-readable recording medium storing therein an update program that causes a computer to execute a process including: sending an issuing request of a second public key certificate to a server under a secure connection to the server using a first public key certificate; receiving the second public key certificate from the server; and conducting a connection confirmation using the second public key certificate when a validity date of the first public key certificate lapses.

According to another aspect of the embodiment, there may be provided an update method, a terminal apparatus, or an update program therefor.

According to a further aspect of the embodiment, there is provided a non-transitory computer-readable recording medium storing a management program for multiple public key certificates used to confirm a validity of a client terminal sending request data and the validity of the request data, the management program that causes a computer to perform a process including: sharing a temporary common key with the client terminal in a state in which a secure connection using a first public key certificate is started; generating a second public key certificate with respect to an issuing request of the second public key certificate from the client terminal; encrypting the second public key certificate by using the temporary common key; and sending the encrypted second public key certificate to the client terminal.

According to a still further aspect of the embodiment, there may be provided a management method, a server, or an update program therefor.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 10 is a diagram illustrating a data configuration example of a certificate management information table in the client terminal;

FIG. 12 is a diagram illustrating a data configuration example of the certificate management information table in the server;

FIG. 22A is a diagram illustrating a case of related art; and

FIG. 22B is a diagram illustrating a case of the embodiment.

DESCRIPTION OF EMBODIMENTS

Figure 1:
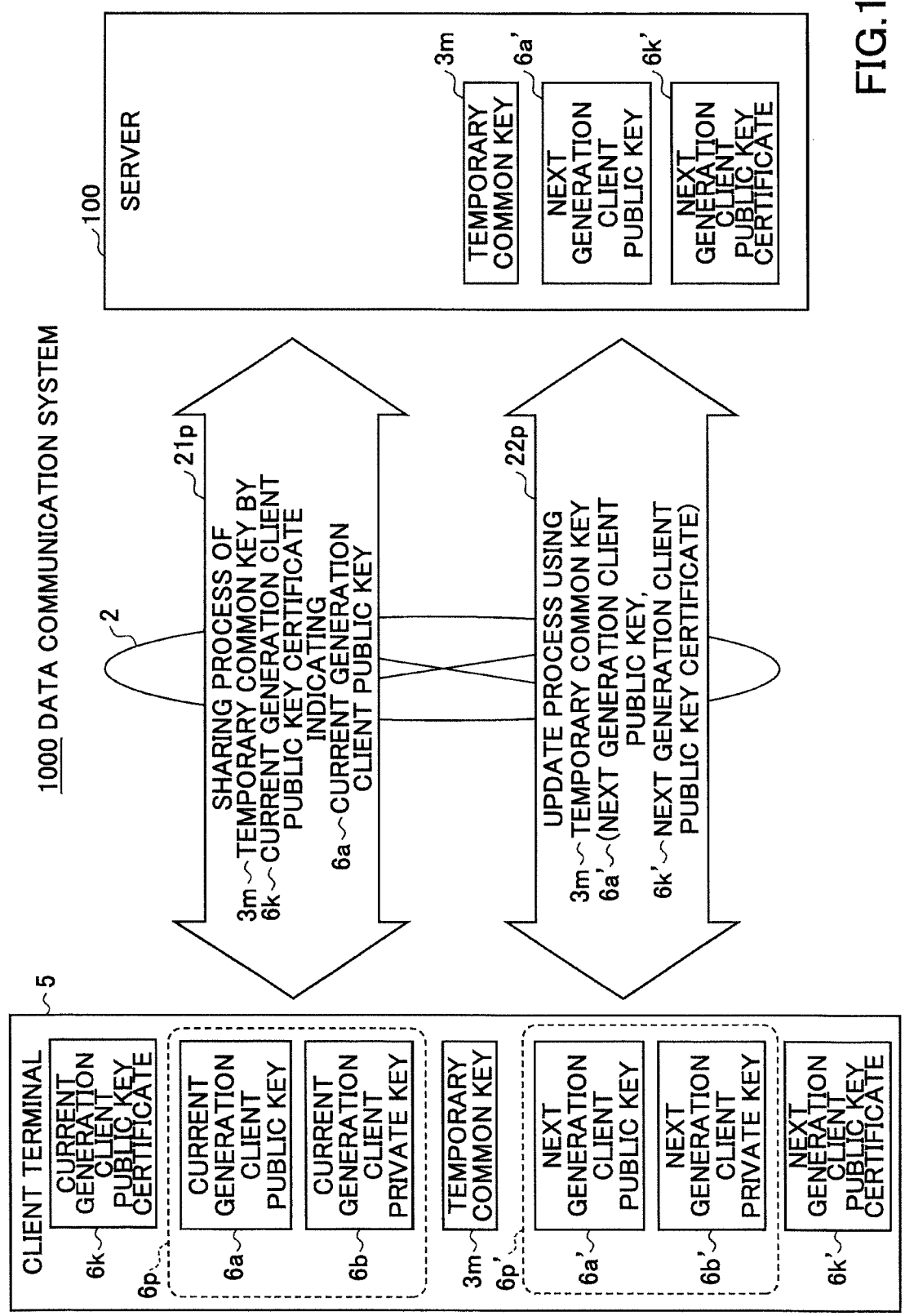
FIG. 1 is a diagram for briefly explaining a data communication system in an embodiment.

In the above described technologies, a temporary public key is changed every time a communication environment is opened. Thus, it is difficult for a third party to estimate a temporary private key corresponding to the temporary public key from communication data. Accordingly, it is very difficult for the third party to decrypt and estimate encrypted communication data.

However, it is difficult to update a public key certificate, which is used to check first communication data exchanged between a client terminal and a server. Thus, a validity date is set to be longer, and the public key certificate is being used for a long term without being changed. In a case in which the same public key certificate is being used for the long term, it becomes relatively easier for the third party to estimate the private key corresponding to the public key included in the public key certificate.

If the private key of the public key certificate of the client terminal is estimated by the third party, the third party may completely impersonate a user of the client terminal. The third party may acquire qualified contents by impersonating the user of the client terminal, unlimitedly copy the qualified contents illegally acquired, and distribute the copied contents to many unspecified parties.

In an embodiment, it is possible to securely update the public key certificate of the client terminal.

In the following, the embodiment of the present invention will be described with reference to the accompanying drawings. In a secure communication method using the public key encryption, if a certain longer key is used, it has been considered that the third party barely acquires the private key. In a case of Elliptic Curve Cryptography (ECC), a key length is longer than or equal to 224 bits in the prime field. In a case of Rivest Shamir Adleman (RSA), the key length is longer than or equal to 2046 bits.

(1) However, recently, performance of a Central Processing Unit (CPU), a memory capacity, and the like of an information processing apparatus have been significantly improved. Also, a technology related to parallel computing using a significantly large number of information processing apparatuses in the Internet has evolved. Thus, if the same client public key is being used, the private key may be estimated, and application program and firmware of a request originator in the parallel computing may be easily impersonated. Also, a sufficient key length has not been confirmed. With further advancing the technology for estimating the private key, a risk for the user to be impersonated becomes higher.

(2) It may be considered to update the application program or the firmware to be the request originator, in which a new client public key certificate and a new private key are embedded, in an appropriate term. In this case, an operation for updating the application program or the firmware creates more workload, and costs more.

(3) Even if the application program or the firmware are updated with more expense, the client public key certificate is similarly used for the signature indicating a valid request originator, which is included in an update request. That is, regarding the client public key certificate used for the update, the same problem described at the above item (1) exists. As a result, the risk of an identity theft is not solved.

As described above, it is difficult to update the client public key certificate of the request originator in a sufficiently secure term. Even if the risk concerning the security is included, generally, a term of the client public key certificate of the request originator is set to be significantly longer for the operation.

FIG. 1 is a diagram for briefly explaining a data communication system in the embodiment. In the data communication system 1000 in the embodiment in FIG. 1, one or more client terminals 5 are connected to a server 100 via a network 2. Communications are conducted with data encrypted by a Public Key Infrastructure (PKI) between each of the client terminals 5 and the server 100. A process, in which the client terminal 5 updates a current generation client public key certificate 6k to a next generation client public key certificate 6k', will be briefly described.

First, the client terminal 5 conducts a sharing process 21p of a temporary common key 3m by communicating with the server 100 by the PKI. At the time of conducting the sharing process 21p, the client terminal 5 retains a current generation client key pair 6p of a current generation client public key 6a and a current generation client private key 6b, and the current generation client public key certificate 6k.

For a data transmission from the client terminal 5 to the server 100, the current generation client key pair 6p and the current generation client public key certificate 6k are used, and data encrypted by the PKI are transmitted to the server 100.

When the temporary common key 3m is shared with the client terminal 5 and the server 100, the client terminal 5 conducts an update process 22p using the temporary common key 3m with the server 100. The client terminal 5 generates a next generation client key pair 6p', encrypts the next generation client public key 6a' with the temporary common key 3m shared with the server 100, and acquires the next generation client public key certificate 6k'.

In the data communication system 1000, the server 100 is regarded as a center that provides various types of information contents such as text, a still image, a video, and the like. The user of the client terminal 5 contracts with a provider administrating the server 100, and the server 100 provides the information contents after confirming the validity of the client terminal 5.

In the data communication system 1000 in the embodiment, the following <Scheme I> and <Scheme II> are provided.

<Scheme I> Provide a scheme for countering the estimation of the current generation client public key 6a over the long time.

<Scheme II> Provide a scheme for contending against an illegal analysis during an execution of the update process 22p.

<Scheme I>

Figure 2:
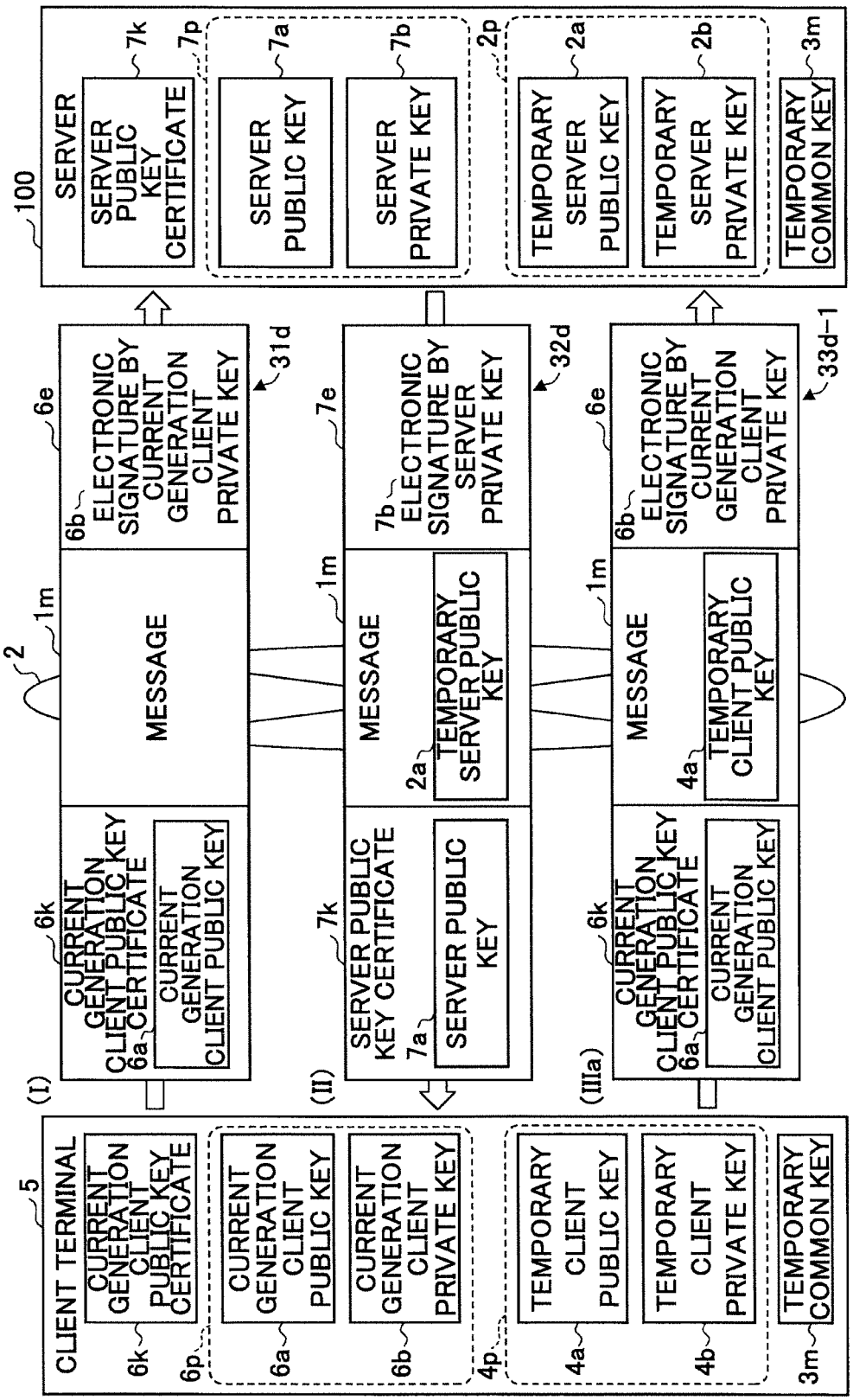
FIG. 2 is a diagram illustrating an example of a communication sequence and a communication data structure in a sharing process.
Figure 3:
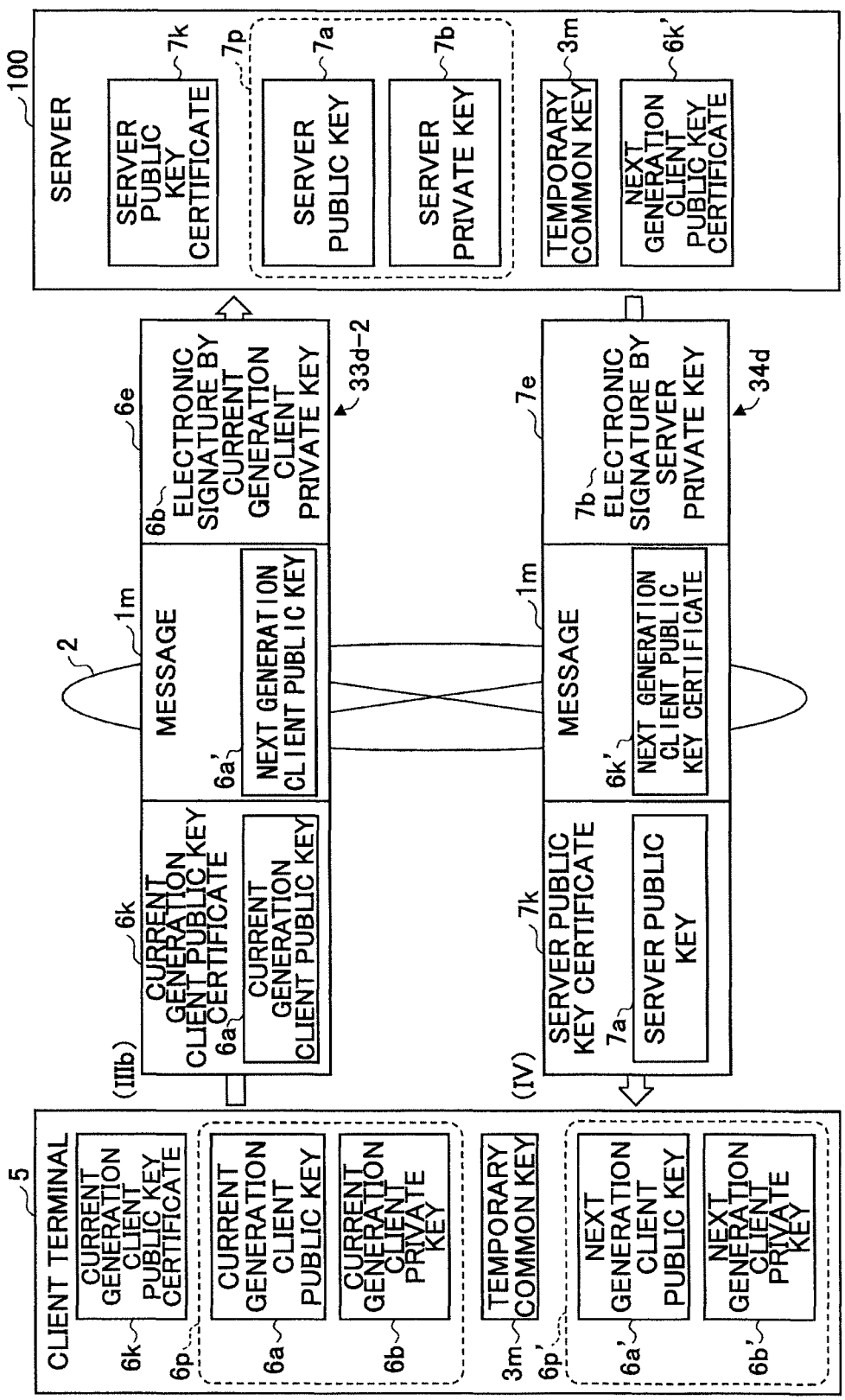
FIG. 3 is a diagram illustrating an example of the communication sequence and the communication data structure in an update process.

In communication using the PKI encryption, an example of a communication sequence for conducting the above described sharing process 21p and update process 22p will be described with reference to FIG. 2 and FIG. 3. In FIG. 2 and FIG. 3, data encrypted based on the PKI includes the current generation client public key certificate 6k (or a server public key certificate 7k) indicating the public key of a sender, a message 1m, and an electronic signature 6e of the sender (or an electronic signature 7e by a server private key 7b). The validity of the public key of the sender is indicated by the current generation client public key certificate 6k (or the server public key certificate 7k), and the data are proved as valid by the electronic signature. The electronic signature is created by the private key of the sender. In explanations below, the sequence is conducted in the same manner.

FIG. 2 is a diagram illustrating an example of the communication sequence and a communication data structure in the sharing process. In step (I), the client terminal 5 sends data 31d to the server 100 in order to share the temporary common key 3m with the server 100. The data 31d are encrypted based on the PKI.

The data 31d include the current generation client public key certificate 6k indicating the current generation client public key 6a, the message 1m, and the electronic signature 6e by the current generation client private key 6b. The client terminal 5 generates a temporary client key pair 4p.

In step (II), the server 100 confirms the validity of the client terminal 5 by the current generation client public key certificate 6k of the data 31d based on the PKI, and determines the validity of the electronic signature 6e by using the current generation client public key certificate 6k indicated by the current generation client public key certificate 6k.

The server 100 generates a temporary server key pair 2p after confirming the validity of the electronic signature 6e of the client terminal 5. Then, the server 100 creates data 32d including the current generation client public key certificate 6k indicating a server public key 7a, the message 1m including the temporary server public key 2a, and the electronic signature 6e by the current generation client private key 6b. The server public key 7a and the server private key 7b are regarded as a server key pair 7p.

In step (IIIa), when the client terminal 5 receives the data 32d, the client terminal 5 generates the temporary common key 3m by using the temporary server public key 2a and a temporary client private key 4b included in the message 1m after confirming that the data 32d are valid data sent from the server 100. The client terminal 5 creates data 33d-1 including a temporary client public key 4a in the message 1m based on the PKI, and sends the data 33d-1 to the server 100.

When the server 100 receives the data 33d-1, the server 100 retrieves a temporary server public key 2a from the message 1m after confirming that the data 33d-1 is valid data sent from the client terminal 5, and generates the temporary common key 3m by the retrieved temporary server public key 2a and a temporary server private key 2b.

That is, the temporary common key 3m, which is used for communications between the client terminal 5 and the server 100, is set to both the client terminal 5 and the server 100. A temporary communication using the temporary common key 3m is established between the client terminal 5 and the server 100.

FIG. 3 is a diagram illustrating an example of the communication sequence and the communication data structure in the update process. In step (IIIb), following the data 33d-1 in FIG. 2, the client terminal 5 generates the next generation client key pair 6p', creates the data 33d-2 including the next generation client public key 6a' in the message 1m based on the PKI, and sends the data 33d-2 to the server 100.

When the server 100 receives the data 33d-2, the server 100 retrieves the next generation client public key 6a' from the message 1m after confirming that the data 33d-2 are valid data sent from the client terminal 5 based on the PKI.

In step (IV), the server 100 issues the next generation client public key certificate 6k' with respect to the next generation client public key 6a' retrieved from the message 1m. The server 100 encrypts the next generation client public key certificate 6k' by the temporary common key 3m, includes the message 1m, creates data 34d based on the PKI, and sends the data 34d to the client terminal 5.

After the client terminal 5 receives the data 34d and confirms that the data 34d are the valid data sent from the client terminal 5 based on the PKI, the client terminal 5 acquires the next generation client public key certificate 6k' from the message 1m by decrypting by the temporary common key 3m.

As described above, the client terminal 5 and the server 100 generate and share the temporary common key 3m at each time of the update process. Since the temporary common key 3m is generated and shared only for one update process, compared with a case of retaining a key pair, which is used to update the public key certificate, and the public key certificate itself for the long time, the term of temporary common key 3m is significantly shorter. The long term is considered as a year unit from a few years to approximately 10 years or the like. A term of the temporary common key 3m may be a hour or day unit.

As described above, it is possible to securely update the next generation client public key 6a' and the next generation client public key certificate 6k', since the next generation client public key 6a' and the next generation client public key certificate 6k' are encrypted by the temporary common key 3m. The temporary common key 3m is shared among the client terminal 5 and the server 100 within the shorter term every time the update process is conducted. Hence, it is possible to extremely reduce the risk of breaking the next generation client public key 6a' and the next generation client public key certificate 6k'.

As described above, the next generation client key pair 6p' is switched prior to estimating the current generation client private key 6b of the client terminal 5. Hence, it becomes significantly difficult for the third party to estimate the current generation client private key 6b of the client terminal 5.

In a case in which before the client terminal 5 receives the next generation client public key certificate 6k' from the server 100, and the validity date of the current generation client public key certificate 6k of the client terminal 5 lapses, in general, a client vender applies an issuance of a new client public key certificate by another procedure. In this case, the client vender applies an invalidation of the current generation client public key certificate 6k.

After that, the client vender distributes the application program and the firmware, which embed the next generation client public key certificate 6k' and operate a next generation client private key 6b', and which operate in the client terminal 5.

In detail, the client vender returns a device corresponding to the client terminal 5 to a maker or a commission agent, and requests to re-deliver the device, in which the next generation client public key certificate 6k' and the next generation client private key 6b' are embedded in the application program or the firmware. Alternatively, the user is re-authenticated, and acquires the next generation client public key certificate 6k' and the next generation private key by updating the application program or the firmware through the Internet.

As described above, in the embodiment, after being shared with the client terminal 5 and the server 100, the next generation client public key 6a' and the next generation client public key certificate 6k' are encrypted and decrypted by the temporary common key 3m.

Accordingly, the next generation client public key 6a' does not appear in the network 2 until the next generation client public key certificate 6k' starts to use the next generation client public key certificate 6k' for the next generation client public key 6a' as the current generation client public key certificate 6k.

That is, it is difficult for the third party to estimate the next generation client public key 6a' until the temporary common key 3m is used and is able to be estimated.

<Scheme II>

In response to an action intercepting a reply of the next generation client public key certificate 6k' of the client terminal 5 from the server 100 to the client terminal 5, the server 100 counts a received count of the message 1m sent from the client terminal 5 in a state in which the next generation client public key certificate 6k' has not been received from the server 100. When the received count exceeds a default value for the operation, the next generation client public key certificate 6k' is invalidated. Also, control is performed to reject a request using that next generation client public key certificate 6k'. By this <Scheme II>, it is possible to respond to the illegal analysis by a retransmission attack.

Figure 4:
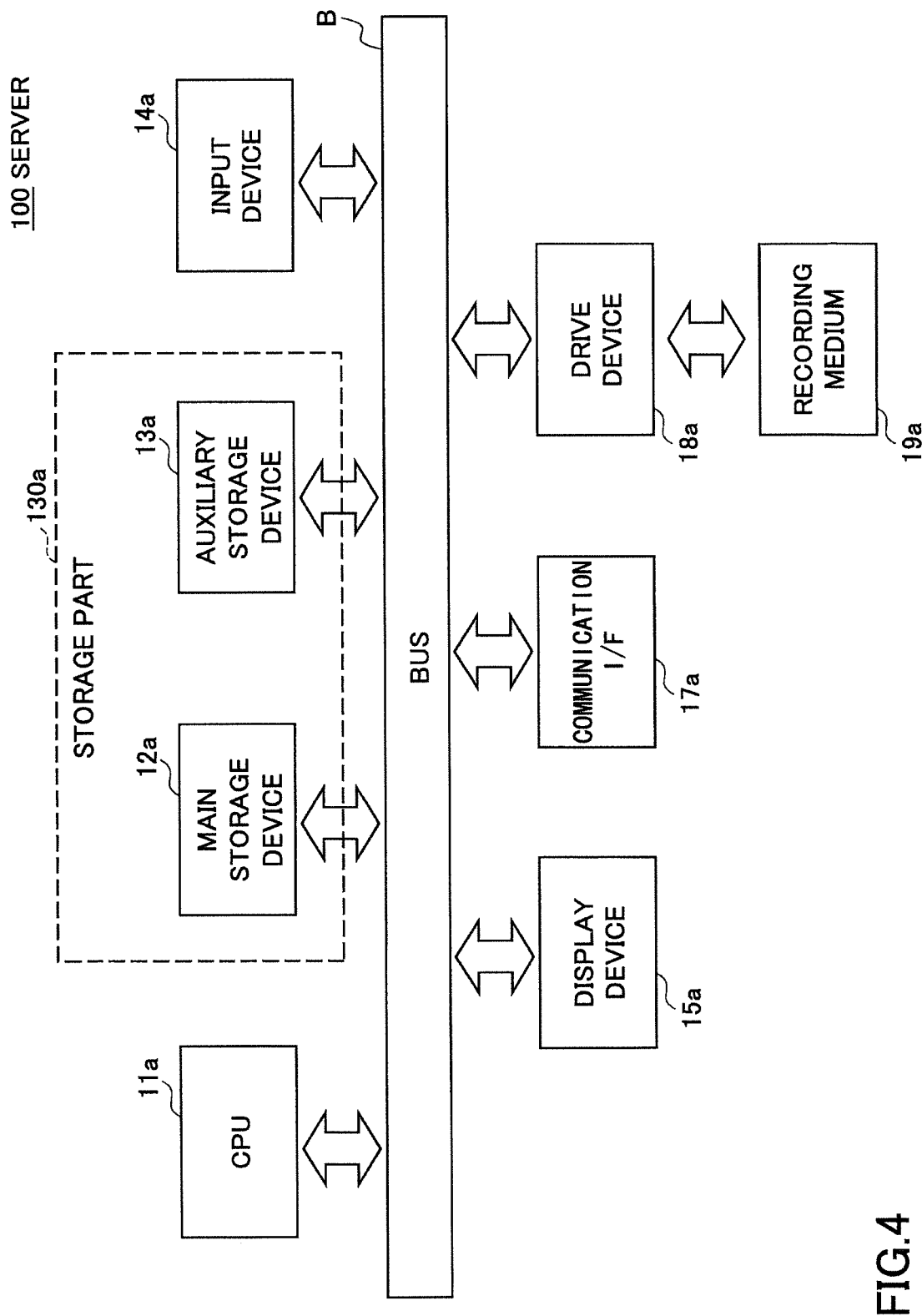
FIG. 4 is a diagram illustrating a hardware configuration of a server.

FIG. 4 is a diagram illustrating a hardware configuration of the server. In FIG. 4, the server 100 is regarded as an apparatus controlled by a computer, and includes a Central Processing Unit (CPU) 11a, a memory as a main storage device 12a, an auxiliary storage device 13a, an input device 14a, a display device 15a, a communication InterFace (I/F) 17a, and a drive device 18a, which are mutually connected via a bus B.

The CPU 11a controls the server 100 in accordance with a program stored in the main storage device 12a. As the main storage device 12a, a Random Access Memory (RAM), a Read Only Memory (ROM), and the like may be used. The main storage device 12a stores or temporarily stores the program executed by the CPU 11a, data used in a process conducted by the CPU 11a, data acquired in the process by the CPU 11a, and the like.

A Hard Disk Drive or the like is used as the auxiliary storage device 13a. The auxiliary storage device 13a stores data such as programs to perform various processes. A part of the programs stored in the auxiliary storage device 13a is loaded to the main storage device 12a, and the various processes are performed by the CPU 11a, so as to realize the various processes. A storage part 130a corresponds to the main storage device 12a and/or the auxiliary storage device 13a.

The input device 14a includes a mouse, a keyboard, and the like, and is used for the user to input various information items used in the process of the server 100. The display device 15a displays various information items under control of the CPU 11a. The communication I/F 17a conducts wired or wireless communications through the network 2. The communications by the communication I/F 17a are not limited to the wired or wireless communications.

For example, the program for realizing the process conducted by the server 100 may be provided to the server 100 by a recording medium 19a, which is a non-transitory tangible recording medium such as a Compact Disc Read-Only Memory (CD-ROM) or the like.

The drive device 18a interfaces between the recording medium 19a (the CD-ROM or the like) set to the drive device 18a and the server 100.

Also, the program for realizing various processes pertinent to the embodiment is stored in the recording medium 19a. The program stored in the recording medium 19a is installed into the server 100 through the drive device 18a. The installed program becomes executable in the server 100.

The recording medium 19a for storing the program is not limited to the CD-ROM, and may be any computer-readable medium. The recording medium 19a being computer-readable may be a portable recording medium such as a Digital Versatile Disc (DVD), a Universal Serial Bus (USB) memory, or the like, or a semiconductor memory such as a flash memory.

The input device 14a and the display device 15a may be integrated as a touch panel.

Figure 5:
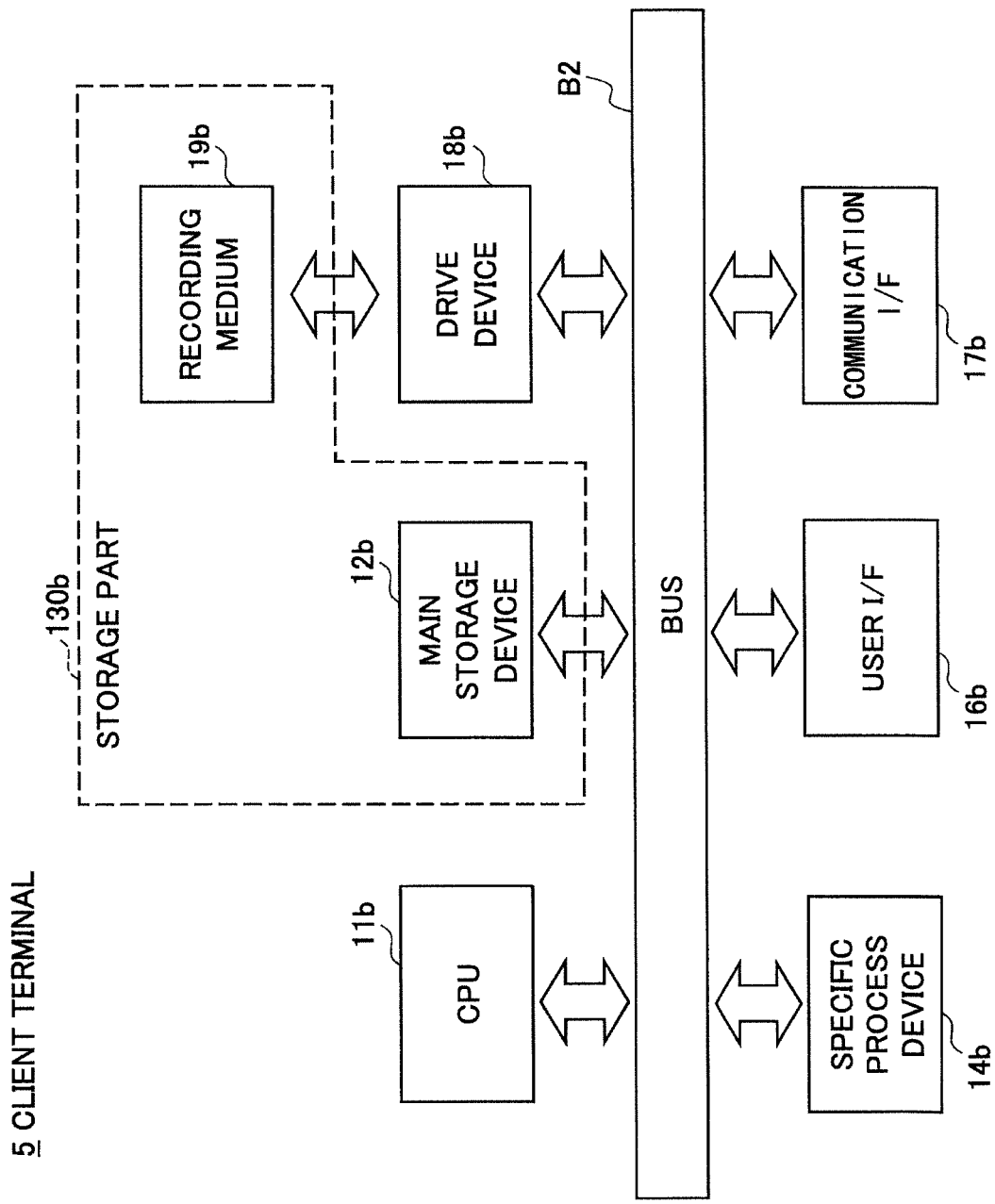
FIG. 5 is a diagram illustrating a hardware configuration of a client terminal.

The client terminal 5 is regarded as an electronic device (hereinafter, simply called "device") including a computer, and may be a television, a Set Top Box (STB), other home electronics, or the like. The client terminal 5 may be a management device pertinent to biometric information. The client terminal 5 may include a hardware configuration as illustrated in FIG. 3. FIG. 5 is a diagram illustrating a hardware configuration of the client terminal.

In FIG. 5, the client terminal 5 may be the electronic device controlled by a computer, and includes a Central Processing Unit (CPU) 11b as a processor, a memory as a main storage device 12b, a specific process device 14b, a user InterFace (I/F) 16b, a communication I/F 17b, and a drive device 18b, which are mutually connected via a bus B2.

The CPU 11b controls the client terminal 5 in accordance with a program stored in the main storage device 12b. A RAM, a ROM, and the like may be used as the main storage device 12b. The main storage device 12b stores or temporarily stores the program executed by the CPU 11b, data used in a process conducted by the CPU 11b, data acquired in the process by the CPU 11b, and the like. When the CPU 11b executes the program stored in the main storage device 12b, various processes are realized by the CPU 11b.

The specific process device 14b conducts a specific process for such as the television, the STB, other home electronics, a management apparatus pertinent to the biometric information. The user I/F 16b displays various information items under control of the CPU 11b, and may be the touch panel for the user's operation input, or the like.

The communication I/F 17b supports one or more communication protocols, and interfaces the wired or wireless communications between the client terminal 5 and the server 100 through the network 2. The communications controlled by the communication I/F 17b are not limited to the wired or wireless communications.

The program for realizing the process conducted by the client terminal 5 is downloaded from an external server through the network 2. Alternatively, the program may be stored in the main storage device 12b of the client terminal 5.

The drive device 18b interfaces between a recording medium 19b (for example, a Secure Digital (SD) card or the like), which is a non-transitory tangible recording medium and is set to the drive device 18b, and the client terminal 5.

A storage part 130b corresponds to the main storage device 12b and/or the auxiliary storage device 13b.

The client terminal 5 may be a desktop type, a notebook type, a laptop type, or the like of a computer terminal, to which the specific process device 14b is detachably connected or which is able to communicate with the specific process device 14b. In this case, the hardware configuration is the same as that depicted in FIG. 3, excluding the specific process device 14b, and the explanations thereof will be omitted.

Next, an example of a functional configuration for realizing <Scheme I> and <Scheme II> will be described. Abbreviations in drawings below are regarded as follows:

CC_PUB represents the current generation client public key 6a.
CC_CRT represents the current generation client public key certificate 6k.
CC_PRV represents the current generation client private key 6b.
NC_PUB represents the next generation client public key 6a'.
NC_CRT represents the next generation client public key certificate 6k'.
NC_PRV represents the next generation client private key 6b'.
TM_COM represents the temporary common key 3m
TMC_PUB represents a temporary client public key 4a.
TMC_PRV represents the temporary client private key 4b.
RT_CRT represents a route public key certificate 9b.
S_PUB represents the server public key 7a.
S_CRT represents a server public key certificate 7k.
S_PRV represents the server private key 7b.
TMS_PUB represents the temporary server public key 2a.
TMS_PRV represents the temporary server private key 2b.

Figure 6:
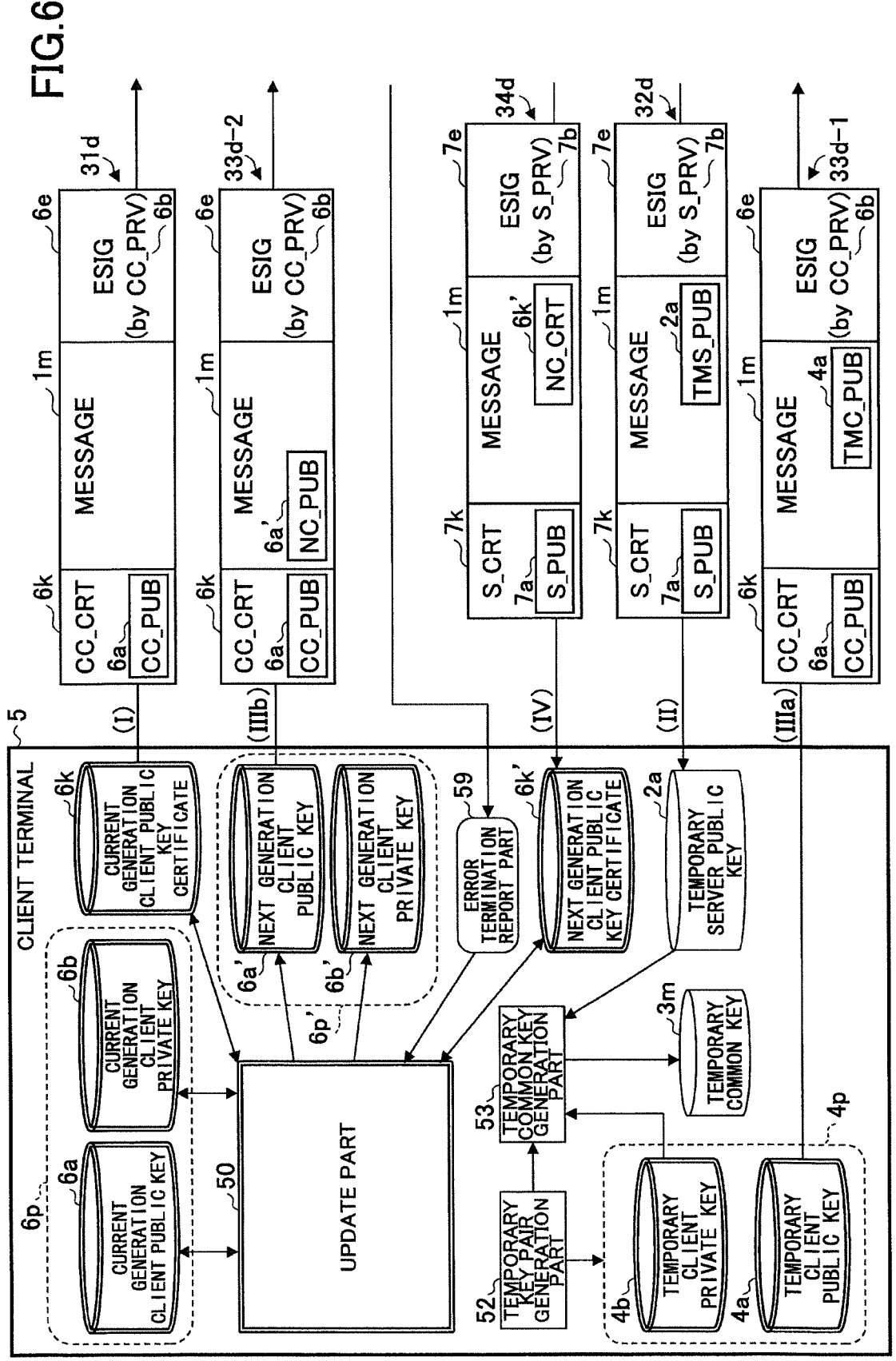
FIG. 6 is a diagram illustrating a first example of a functional configuration of the client terminal.

FIG. 6 is a diagram illustrating a first example of a functional configuration of client terminal. In FIG. 6, the client terminal 5 includes an update part 50, a temporary key pair generation part 52, and a temporary common key generation part 53. The update part 50, the temporary key pair generation part 52, and the temporary common key generation part 53 are realized by processes, which respective programs cause the CPU 11b to perform.

Also, in the client terminal 5, the storage part 130b stores the current generation client public key 6a, the current generation client public key certificate 6k, the current generation client private key 6b, the next generation client public key 6a', the next generation client public key certificate 6k', the next generation client private key 6b', the temporary server public key 2a, the temporary client public key 4a, the temporary client private key 4b, and the like.

The update part 50 controls the sharing process 21p and the update process 22p, which are depicted in FIG. 1, to update current generation client public key certificate 6k. The temporary key pair generation part 52 generates the temporary client key pair 4p to generate the temporary common key 3m. The temporary client public key 4a and the temporary client private key 4b are stored as the temporary client key pair 4p.

The temporary common key generation part 53 generates the temporary common key 3m by the temporary server public key 2a and the temporary client private key 4b to share with the server 100. The temporary common key 3m is stored in the storage part 130b.

First, a process pertinent to the above described <Scheme I> will be described. Steps in FIG. 6 correspond to those in FIG. 1 and FIG. 2.

In step (I), the temporary server public key 2a is requested. The update part 50 creates the data 31d by adding the current generation client public key certificate 6k indicating the current generation client public key 6a and the electronic signature 6e created by using the current generation client private key 6b to the message 1m. The update part 50 sends the data 31d to the server 100.

On the other hand, the update part 50 creates the temporary client key pair 4p by the temporary key pair generation part 52. Since the temporary client key pair 4p is generated, the temporary client public key 4a and the temporary client private key 4b are stored in the storage part 130b.

In step (II), the temporary common key 3m is shared. The temporary common key generation part 53 receives the data 32d from the server 100. The data 32d include the server public key certificate 7k indicating the server public key 7a, and the message 1m including the temporary server public key 2a, and the electronic signature 7e by the server private key 7b.

After the temporary common key generation part 53 confirms the validity of the server public key certificate 7k of the data 32d, the validity of the electronic signature 7e is confirmed by using the server public key 7a indicated by the server public key certificate 7k in order to confirm that the data 32d are the valid data created by the valid server 100.

After that, the temporary common key generation part 53 acquires the temporary server public key 2a from the message 1m of the data 32d, and generates the temporary common key 3m by the acquired temporary server public key 2a, and the temporary client private key 4b generated by the temporary key pair generation part 52. The temporary common key 3m generated by the temporary common key generation part 53 is stored in the storage part 130b.

On the other hand, the client terminal 5 may receive, from the server 100, an error termination report, instead of the data 32d. When the current generation client public key certificate 6k has expired at the server 100, an error termination report part 59 sends the error termination report, which is received from the server 100, to the update part 50.

The update part 50 displays, at the user I/F 16b for the user, a message indicating that the update of the current generation client public key certificate 6k has failed. In this case, the user may contact a provider administrating the server 100, conduct a predetermined procedure, and acquire the next generation client public key certificate 6k'.

In step (IIIa), the temporary client public key 4a is reported. The update part 50 creates data 33d-1 by adding the current generation client public key certificate 6k indicating the current generation client public key 6a and the electronic signature 6e by the current generation client private key 6b, with respect to the message 1m including the temporary client public key 4a. The update 50 sends the data 33d-1 to the server 100. The temporary common key 3m is also generated by the server 100.

In step (IIIb), the next generation client public key certificate 6k' is requested. The update part 50 encrypts the next generation client public key 6a' by the temporary common key 3m. The update part 50 creates data 33d-2 by adding the current generation client public key certificate 6k indicating the current generation client public key 6a and the electronic signature 6e by the current generation client private key 6b to the message 1m including the encrypted next generation client public key 6a'. The update part 50 sends the data 33d-2 to the server 100.

In step (IV), the next generation client public key certificate 6k' is acquired. The update part 50 receives data 34d from the server 100. The data 34d includes the server public key certificate 7k indicating the server public key 7a, the message 1m including the next generation client public key certificate 6k', and the electronic signature 7e by the server private key 7b. The next generation client public key certificate 6k' is encrypted by the temporary common key 3m.

After the update part 50 confirms the validity of the server public key certificate 7k of the data 34d, the update part 50 confirms the validity of the electronic signature 7e by using the server public key 7a indicating the server public key certificate 7k, so as to confirm that the data 34d are data created by the valid server 100.

After that, the update part 50 decrypts the next generation client public key certificate 6k' of the message 1m in the data 34d, by the temporary common key 3m. The decrypted next generation client public key certificate 6k' is stored in the storage part 130b.

As described above, the client terminal 5 and the server 100 confirm their validity to each other, and establish communications with the temporary common key 3m. The next generation client public key certificate 6k' is securely acquired by using the temporary common key 3m.

The temporary common key 3m is a secret key used only to acquire the next generation client public key certificate 6k'. Hence, the temporary common key 3m is not used longer.

Also, the next generation client key pair 6p' is generated at an initial stage using the current generation client public key certificate 6k, and the next generation client public key certificate 6k' is acquired from the server 100. It is possible to make time to use the current generation client key pair 6p shorter.

In a case in which the update part 50 has not received the next generation client public key certificate 6k' from the server for a predetermined time after step (IIIa) and (IIIb), that is, in a case in which step (IV) is not conducted, the data 33d-1 and the data 33d-2 may be re-sent. As a result, the client terminal 5 may receive the error termination report. The error termination report received from the server is reported to the update part 50 by the termination report part 59.

The update part 50 determines that there is a case in which a reply of the next generation client public key certificate 6k' (data 34d) from the server 100 is intercepted. Then, the update part 50 displays, at the user I/F 16b for the user, a message indicating that the update of the current generation client public key certificate 6k has failed. In this case, the user may contact the provider administrating the server 100, conduct a predetermined procedure, and acquire the next generation client public key certificate 6k'.

Figure 7:
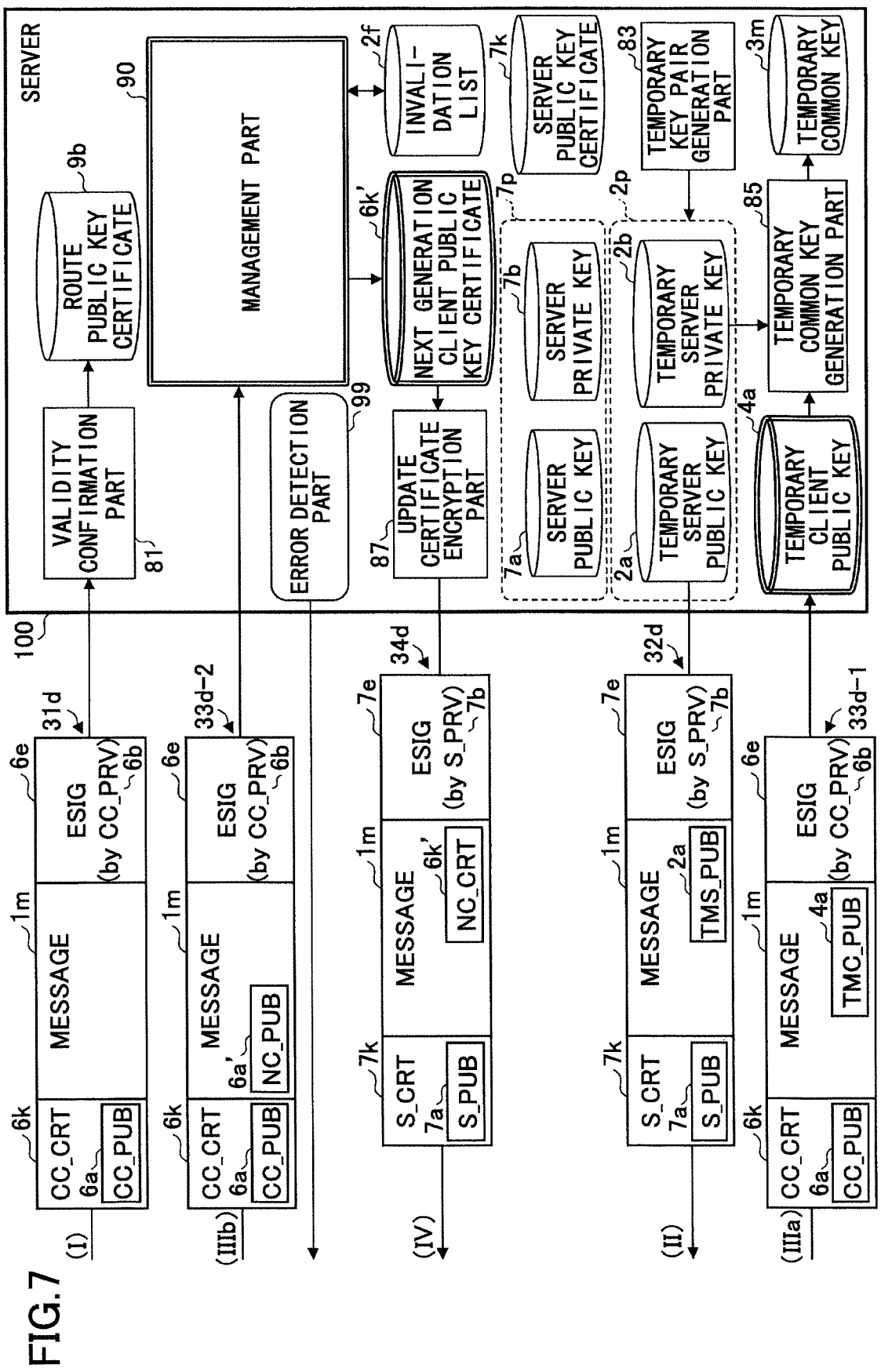
FIG. 7 is a diagram illustrating a first example of a functional configuration of the server.

FIG. 7 is a diagram illustrating a first example of a functional configuration of the server. The functional configuration of the server 100 depicted in FIG. 7 corresponds to the first example of the functional configuration of the client terminal 5 depicted in FIG. 6.

In FIG. 7, the server 100 includes a validation confirmation part 81, a temporary key pair generation part 83, a temporary common key generation part 85, an updated certificate encryption part 87, a management part 90, and an error detection part 99. The validation confirmation part 81, the temporary common key generation part 85, the management part 90, and the error detection part 99 are realized by processes, which respective programs cause the CPU 11b to perform.

Also, in the server 100, the storage part 130a stores the temporary server public key 2a, the temporary server private key 2b, an invalidation list 2f, the temporary common key 3m, the temporary client public key 4a, the next generation client public key certificate 6k', the route public key certificate 9b, and the like.

The validation confirmation part 81 confirms the validity of the current generation client public key certificate 6k of the data 31 received from the client terminal 5. The temporary key pair generation part 83 generates the temporary server key pair 2p to generate the server key pair 7p. The temporary server public key 2a and the temporary server private key 2b are stored as the temporary server key pair 2p in the storage part 130a.

The temporary common key generation part 85 generates the temporary common key 3m by using the temporary server private key 2b generated by the temporary key pair generation part 83 and the temporary client public key 4a sent from the client terminal 5. The temporary common key 3m is stored in the storage part 130a.

The management part 90 manages each of client public key certificates including the current generation client public key certificate 6k and next generation client public key certificate 6k, which are issued to the client terminal 5. Also, the management part 90 confirms the electronic signature 6e for each set of the data 31d, 33d-1, and 33d-2, checks the validity of a request from the client terminal 5, and issues the client public key certificate.

The management part 90 confirms the validity of the current generation client public key certificate 6k by using the electronic signature 6e, and checks the validity date of the current generation client public key certificate 6k. Also, the management part 90 confirms that the next generation client public key certificate 6k' has not been registered, and generates and registers the next generation client public key certificate 6k'. Moreover, the management part 90 confirms whether the request sent from the client terminal 5 exceeds an invalid request count restriction.

The error detection part 99 reports the error termination to the client terminal 5 when the validity is not sufficiently confirmed by the validation confirmation part 81 or the management part 90.

The processes at the server 100 will be described by corresponding to steps (I), (II), (IIIa), (IIIb), and (IV) in FIG. 6.

In step (I), a request of the temporary server public key 2a is received. In the server 100, when the data 31d including the message 1m requesting the temporary server public key 2a is received, the validation confirmation part 81 confirms the current generation client public key certificate 6k based on the route public key certificate 9b.

Also, the validation confirmation part 81 confirms whether the data 31d are valid data created by the valid client terminal 5, by checking the electronic signature 6e using the current generation client public key 6a indicating the current generation client public key certificate 6k.

Furthermore, the validation confirmation part 81 confirms whether the current generation client public key certificate 6k has been registered, and checks based on the validity date of the current generation client public key certificate 6k whether the request of the temporary server public key 2a is received before the validity date. When the current generation client public key certificate 6k has not been registered, and when the validity date of the current generation client public key certificate 6k lapses, the error detection part 99 sends the error termination report to the client terminal 5.

In step (II), the temporary server key pair 2p is generated in order to share the temporary common key 3m with the client terminal 5. The temporary key pair generation part 83 generates the temporary server key pair 2p. The server public key 7a and the server private key 7b are stored as the temporary server key pair 2p in the storage part 130a.

The server 100 generates the data 32d including the server public key certificate 7k indicating the server public key 7a, the message 1m including the temporary server public key 2a, and the electronic signature 7e created by the server private key 7b, and sends the data 32d to the client terminal 5.

In step (IIIa), the temporary client public key 4a is received. The validation confirmation part 81 confirms the validity of the current generation client public key certificate 6k with respect to the data 33d-1 including the temporary client public key 4a, and checks the electronic signature 6e by using the current generation client public key 6a indicated by the current generation client public key certificate 6k. After the data 33-1 are confirmed as data created by the valid client terminal 5, the temporary client public key 4a is acquired from the message 1m.

After the management part 90 confirms that a request count is less than or equal to the invalid request count restriction, the temporary common key generation part 85 generates the temporary common key 3m by using the temporary client public key 4a and the temporary server private key 2b. The generated temporary common key 3m is stored in the storage part 130a.

In step (IIIb), a request of the next generation client public key certificate 6k' is received. The validation confirmation part 81 confirms the validity of the current generation client public key certificate 6k by referring to the route public key certificate 9b with respect to the data 33d-2 including encrypted next generation client public key 6a', and checks the electronic signature 6e by using the current generation client public key 6a indicated by the current generation client public key certificate 6k.

After the validity is confirmed, the management part 90 determines whether the next generation client public key certificate 6k' has been registered for the next generation client public key 6a'. Moreover, the management part 90 checks the validity date of the current generation client public key certificate 6k. Furthermore, the management part 90 confirms whether the request count is less than or equal to the invalid request count restriction.

When it is determined that the request has been received one or more times less than or equal to the invalid request count restriction, the management part 90 decrypts the next generation client public key 6a' in the message 1m by using the temporary common key 3m, and generates the next generation client public key certificate 6k' with respect to the next generation client public key 6a'. The generated next generation client public key certificate 6k' is stored in the storage part 130b.

In step (IV), the updated certificate encryption part 87 encrypts the next generation client public key certificate 6k' generated by the management part 90, creates the data 34d by including the encrypted next generation client public key certificate 6k' in the message 1m, and sends the created data 34d to the client terminal 5. The data 34d includes the server public key certificate 7k indicating the server public key 7a, the message 1m including the encrypted next generation client public key certificate 6k', and the electronic signature 7e created by using the server private key 7b.

After the data 34d including the next generation client public key certificate 6k' is sent to the client terminal 5, when receiving again the data 33d-1 or 33d-2 from the client terminal 5, the management part 90 increments the received count by one. When the received count exceeds the invalid request count restriction, it is determined that the next generation client public key certificate 6k' (the data 34d) sent from the server 100 is intercepted. In this case, the error detection part 99 sends the error termination report to the client terminal 5.

In the first example of the functional configuration of the client terminal 5 in FIG. 6 and the first example of the functional configuration of the server 100 in FIG. 7, the client terminal 5 separately sends the server 100 the temporary client public key 4a by the data 33d-1 and the next generation client public key 6a' encrypted by the temporary common key 3m by the data 33d-2. In step (IIIa), the update part 50 may include the temporary client public key 4a and the next generation client public key 6a' encrypted by the temporary common key 3m together in the message 1m, and send them to the server 100 one time.

In this case, the server 100 may receive data, in which the temporary client public key 4a and the next generation client public key 6a' encrypted by the temporary common key 3m are included together in the message 1m. Processes in step (IIIa) and step (IIIb) may be conducted for one set of the data.

Figure 8:
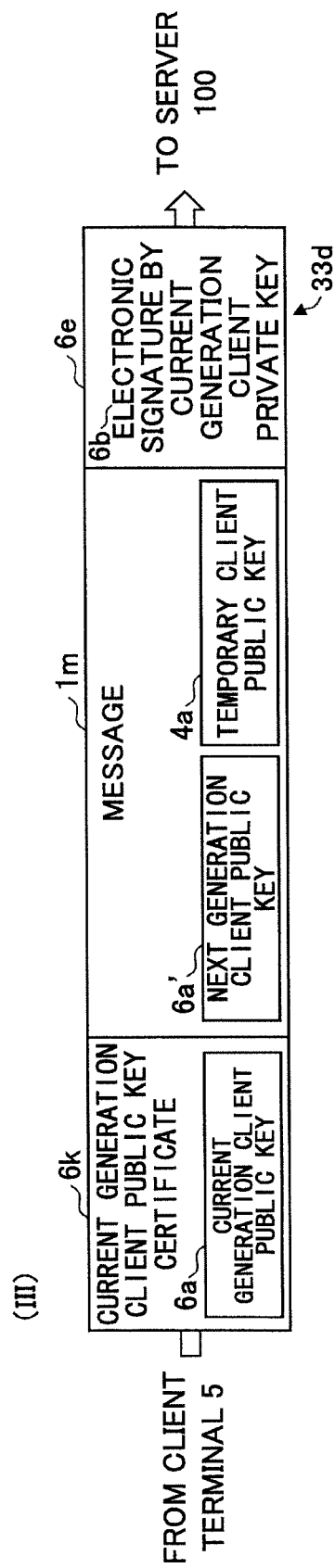
FIG. 8 is a diagram illustrating an example of a communication data structure.

FIG. 8 is a diagram illustrating an example of a communication data structure. In FIG. 8, the communication data structure is depicted in a case of using one set of data in step (IIIa) and step (IIIb). In this case, step (IIIa) and step (IIIb) are collectively called "step (III)".

After generating the temporary common key 3m, the update part 50 of the client terminal 5 encrypts the next generation client public key 6a' by using the temporary common key 3m.

After that, the update part 50 includes the temporary client public key 4a and the next generation client public key 6a' encrypted by using the temporary common key 3m, and creates data 33d by adding the current generation client public key certificate 6k indicating the current generation client public key 6a and the electronic signature 6e created by the current generation client private key 6b to the message 1m.

In step (III), the server 100 receives the data 33d including the temporary client public key 4a and the next generation client public key 6a' encrypted by the temporary common key 3m.

The validation confirmation part 81 of the server 100 confirms the validity of the current generation client public key certificate 6k, and checks the electronic signature 6e by using the current generation client public key 6a indicated by the current generation client public key certificate 6k. After the data 33d are confirmed as the data created by the valid client terminal 5, the temporary client public key 4a is acquired from the message 1m.

The temporary common key generation part 85 generates the temporary common key 3m by using the temporary client public key 4a and the temporary server private key 2b. The generated temporary common key 3m is stored in the storage part 130a.

After the management part 90 confirms that the current generation client public key certificate 6k has been registered, the management part 90 checks whether the data 33d are received before the validity date of the current generation client public key certificate 6k. Moreover, the management part 90 determines whether the request count is less than or equal to the invalid request count restriction.

When the request count is less than or equal to the invalid request count restriction, the management part 90 decrypts the next generation client public key 6a' included in the message 1m by using the temporary common key 3m, and generates the next generation client public key certificate 6k' with respect to the next generation client public key 6a'. The generated next generation client public key certificate 6k' is stored in the storage part 130b.

In step (IV), the next generation client public key certificate 6k' is provided from the server 100 to the client terminal 5.

Figure 9:
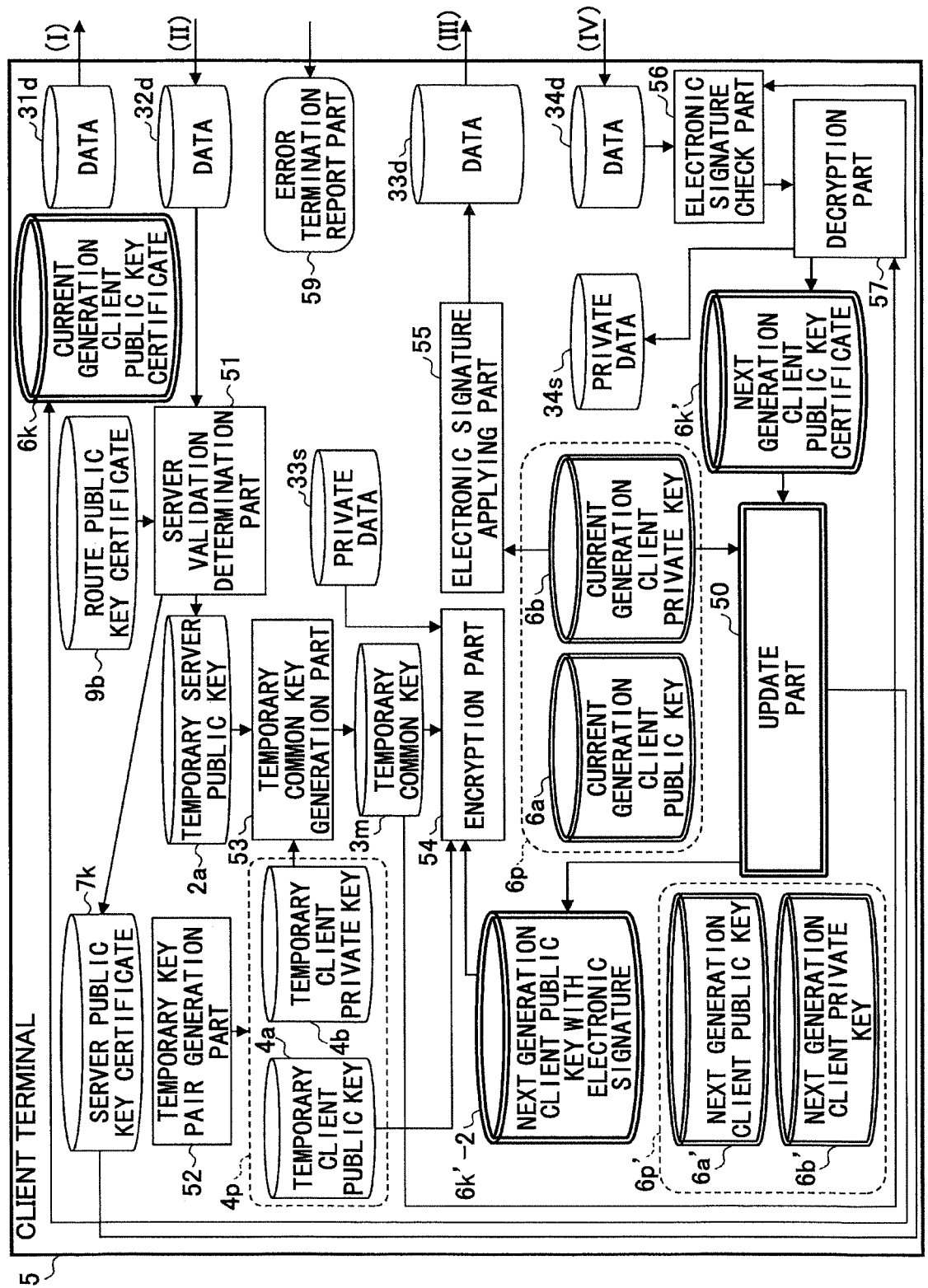
FIG. 9 is a diagram illustrating a second example of a functional configuration of the client terminal.

In the following, a second example of the functional configuration of the server 100 will be described with reference to FIG. 9 and FIG. 10. In the second example of the functional configuration, details of the first example will be depicted. In FIG. 9 and FIG. 10, a case of the data 33d in step (III) depicted in FIG. 8 is assumed.

FIG. 9 is a diagram illustrating a second example of the functional configuration of the client terminal. In FIG. 9, the client terminal 5 includes the update part 50, a server validation determination part 51, a temporary key pair generation part 52, a temporary common key generation part 53, an encryption part 54, an electronic signature applying part 55, an electronic signature check part 56, a decryption part 57, and the error termination report part 59.

The update part 50, the server validation determination part 51, the temporary key pair generation part 52, the temporary common key generation part 53, the encryption part 54, the electronic signature applying part 55, the electronic signature check part 56, the decryption part 57, and the error termination report part 59 are realized by processes, which respective programs cause the CPU 11b to perform.

Also, at the client terminal 5, the storage part 130b stores, in the storage part 130b, the temporary server public key 2a, the temporary client key pair 4p, the temporary common key 3m, the current generation client key pair 6p, the current generation client public key certificate 6k, the next generation client key pair 6p', the next generation client public key certificate 6k', a next generation client public key certificate 6k'-2 with the electronic signature 6e, the server public key certificate 7k, the route public key certificate 9b, the data 31d to 34d, private data 33s, and private data 34s, and the like.

The update part 50 controls the sharing process 21p and the update process 22p described above with reference to FIG. 1, to update the current generation client public key certificate 6k.

The update part 50 conducts a term check of the current generation client key pair 6p. Also, the update part 50 confirms whether the next generation client key pair 6p' has been received from the server 100. When the next generation client key pair 6p' has not been received, the sharing process 21p and the update process 22p are performed. In the update process 22p, when the update part 50 generates the next generation client key pair 6p' and receives the next generation client key pair 6p' from the server 100, the update part 50 registers the next generation client key pair 6p'.

In step (I), when the update part 50 determines, by the term check, that an update time of the current generation client key pair 6p, the update part 50 sends the data 31d including the current generation client public key certificate 6k. The data 31d correspond to the request of the temporary server public key 2a used to generate the temporary common key 3m.

In step (II), when the client terminal 5 receives the data 32d from the server 100, the server validation determination part 51 determines whether the data 32d are the valid data, which are created by the valid server 100 and have not been tampered with.

In step (III), when the server validation determination part 51 determines the data 32d as the valid data, the temporary key pair generation part 52 generates the temporary client key pair 4p to share the temporary common key 3m with the server 100. The temporary client public key 4a and the temporary client private key 4b are stored as the temporary client key pair 4p in the storage part 130b.

The temporary common key generation part 53 generates the temporary common key 3m by using the temporary client private key 4b and the temporary server public key 2a of the server 100.

The encryption part 54 creates the message 1m to send to the server 100 by using the private data 33s and the next generation client public key certificate 6k'-2 with the electronic signature 6e, and encrypts the message 1m by using the temporary common key 3m. The encryption part 54 sets the temporary client public key 4a in the message 1m.

The next generation client public key certificate 6k'-2 with the electronic signature 6e may be regarded as a public key certificate, to which the electronic signature 6e is applied to the next generation client public key certificate 6k' received from the server 100 by the update part 50 using Digital Rights Management (DRM). By the DRM, use or copy of the next generation client public key certificate 6k' is controlled and restricted.

Next, the electronic signature applying part 55 creates the electronic signature 6e by using the current generation client private key 6b with respect to the private data 33s, and creates the data 33d. The data 33d are created by the current generation client public key certificate 6k indicating the current generation client public key 6a, the private data 33s, the next generation client public key certificate 6k'-2 with the electronic signature 6e, the temporary client public key 4a, and the electronic signature 6e created by the current generation client private key 6b. The message 1m of the data 33d includes the private data 33s, the next generation client public key certificate 6k'-2 with the electronic signature 6e, and the temporary client public key 4a. The data 33d are sent to the server 100.

In step (IV), the electronic signature check part 56 checks the electronic signature 7e of the data 34d, and determines whether the data 34d are the valid data sent from the valid server 100. The decryption part 57 acquires the private data 34s from the message 1m of the data 34d, and decrypts the next generation client public key certificate 6k' by using the temporary common key 3m. The private data 34s is stored in the storage part 130b, and the next generation client public key certificate 6k' is reported to the update part 50.

The update part 50 checks the electronic signature 6e of the next generation client public key certificate 6k' reported from the decryption part 57, and registers and maintains the next generation client public key certificate 6k' by associating with the next generation client key pair 6p'.

A process by the error termination report part 59 is the same as that in the first example of the functional configuration in FIG. 6, and the explanation thereof will be omitted.

The client terminal 5 includes a certificate management information table 60 as depicted in FIG. 10, in order to maintain the current generation client public key certificate 6k, the next generation client public key certificate 6k', and the like. FIG. 10 is a diagram illustrating a data configuration example of the certificate management information table in the client terminal.

In FIG. 10, the certificate management information table 60 retained in the client terminal 5 is maintained in the storage part 130b. The certificate management information table 60 includes items of "ELEMENT NUMBER", "CERTIFICATE ID", "CURRENT FLAG", "KEY TYPE", "KEY LENGTH", "PUBLIC KEY", "PRIVATE KEY", "NEXT GENERATION CERTIFICATE ELEMENT NUMBER", "PREVIOUS GENERATION CERTIFICATE ELEMENT NUMBER", "VALIDITY DATE", "CLIENT PUBLIC KEY CERTIFICATE", and the like.

The item "ELEMENT NUMBER" indicates a reference number given to the current generation client public key certificate 6k. The item "ELEMENT NUMBER" may indicate a record number for specifying a record.

The "CERTIFICATE ID" indicates identification information of the client public key certificate. The "CERTIFICATE ID" may indicate a certificate publisher ID and a certificate serial number. In this example, the "CERTIFICATE ID" is represented by a two-layered structure of the certificate publisher ID and the certificate serial number, but may be represented by a three or more layered structure.

The certificate publisher ID indicates identification information of the server 100 being a publisher. The certificate serial number indicates a serial number given to each of the public key certificates, which the server 100 issued.

The item "CURRENT FLAG" indicates whether the certificate ID is used for the current generation client public key 6a. That is, the item "CURRENT FLAG" indicates that the client public key certificate is currently used.

In a case of the current generation client public key 6a, the item "CURRENT FLAG" indicates "1". In a case in which the client public key certificate is for unused generation, the item "CURRENT FLAG" indicates "0". Also, an initial value of the item "CURRENT FLAG" indicates "0".

The item "KEY TYPE" indicates an encryption method. A key type "E" indicates an Elliptic Curve Cryptography (ECC). A key type "R" indicates Rivest Shamir Adleman (RSA). The item "KEY LENGTH" indicates a bit length.

The item "PUBLIC KEY" indicates a value (binary) of the public key, which is recorded in an encrypted state. The item "PRIVATE KEY" indicates a value (binary) of the private key, which is recorded in the encryption state.

The item "NEXT GENERATION CERTIFICATE ELEMENT NUMBER" indicates the element number of a next generation client certificate. The item "PREVIOUS GENERATION CERTIFICATE ELEMENT NUMBER" indicates the element number of a previous generation client certificate.

The item "VALIDITY DATE" indicates a date when the client public key certificate is expired, in "YYYYMMDD: hhmmss" by a Coordinated Universal Time (UTC) format. The item "CLIENT PUBLIC KEY CERTIFICATE" indicates a substance (binary) of the client public key certificate comply with X.509.

When the current generation client public key certificate 6k is expired or when the current generation client public key certificate 6k is rejected by the server 100, the update part 50 sets "1" in the item "CURRENT FLAG" of a record pointed at from the item "NEXT GENERATION CERTIFICATE ELEMENT NUMBER", and then, deletes the record of the current generation client public key certificate 6k. Also, the update part 50 uses the next generation client public key certificate 6k' as a new current generation client public key certificate.

When the next generation client public key certificate 6k' is sent to the request (data 33d) of the client terminal 5, the update part 50 stores the next generation client public key 6a' in the item "PUBLIC KEY", and stores the next generation client private key 6b' in the item "PRIVATE KEY".

Also, the update part 50 sets the element number of the record of the current generation client public key certificate 6k in the item "PREVIOUS GENERATION CERTIFICATE ELEMENT NUMBER". After that, the update part 50 sets the element number of an additionally registered record in the item "ELEMENT NUMBER OF NEXT GENERATION CLIENT PUBLIC KEY CERTIFICATE". As described above, the current generation client public key certificate 6k is associated with the next generation client public key certificate 6k'.

When the client terminal 5 indicates the current generation client public key certificate 6k and sends the data 33d to the server 100, the update part 50 confirms whether a value exists in the item "NEXT GENERATION CERTIFICATE ELEMENT NUMBER" of the record of the current generation client public key certificate 6k.

When the value does not exist in the item "NEXT GENERATION CERTIFICATE ELEMENT NUMBER", the update part 50 generates the next generation client key pair 6p', encrypts the next generation client public key 6a' by using the temporary common key 3m, sets the encrypted next generation client public key 6a' in the message 1m, and sends the message 1m to the server 100.

In the initial state of the certificate management information table 60 of the client terminal 5, the server 100 is requested to issue two or more client public key certificates. It is preferable to register these certificates by being associated with each other as the current generation client public key certificate 6k and the next generation client public key certificate 6k'. It becomes possible to react a circumstance in which the current generation client public key certificate 6k has expired before the next generation client public key certificate 6k' for a first expiration is provided from the server 100.

Figure 11:
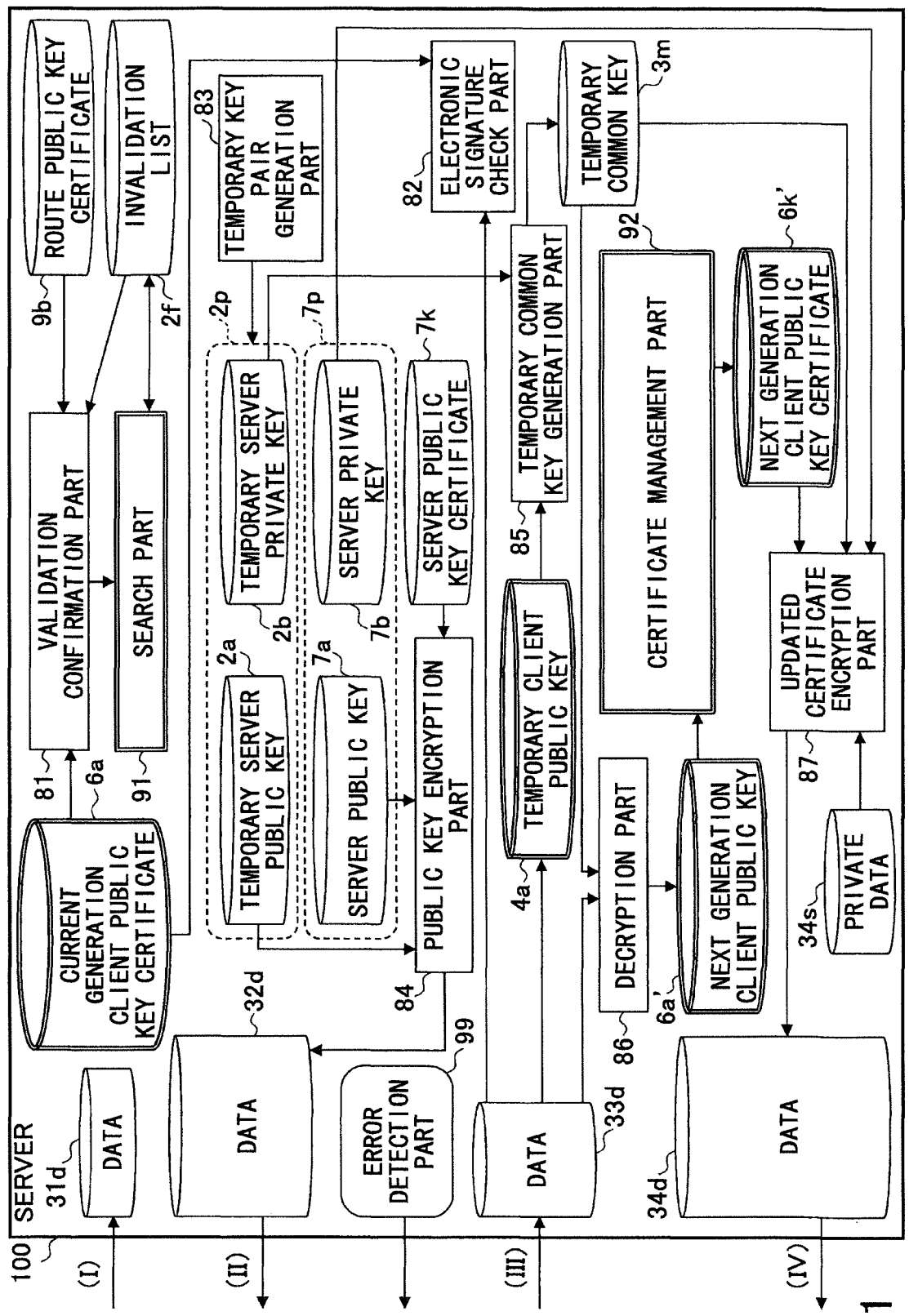
FIG. 11 is a diagram illustrating a second example of a functional configuration of the server.

FIG. 11 is a diagram illustration a second example of the functional configuration of the server. The second example of the functional configuration of the server 100 depicted in FIG. 11 corresponds to the second example of the functional configuration of the client terminal 5 depicted in FIG. 9.

In FIG. 11, the server 100 includes a validation confirmation part 81, an electronic signature check part 82, the temporary key pair generation part 83, a temporary key pair generation part 84, the temporary common key generation part 85, a decryption part 86, the updated certificate encryption part 87, a search part 91, and a certificate management part 92.

The validation confirmation part 81, the electronic signature check part 82, the temporary key pair generation part 83, the temporary key pair generation part 84, the temporary common key generation part 85, the decryption part 86, the updated certificate encryption part 87, the search part 91, and the certificate management part 92 are realized by processes, which respective programs cause the CPU 11a to perform.

Also, at the server 100, the storage part 130a stores the temporary server key pair 2p, the temporary client public key 4a, the next generation client public key 6a', the next generation client public key certificate 6k', the server key pair 7p, the data 31d to 34d, and the like.

The search part 91 and the certificate management part 92 correspond to the management part 90 in FIG. 7. Also, processes conducted by the validation confirmation part 81, the electronic signature check part 82, the temporary key pair generation part 83, and the temporary key pair generation part 84 correspond to the sharing process 21p depicted in FIG. 1. Moreover, the electronic signature check part 82, the temporary common key generation part 85, a decryption part 86, and the certificate management part 92 correspond to the update process 22p.

In step (I), when receiving the data 31d from the client terminal 5, the validation confirmation part 81 confirms the validity of the current generation client public key certificate 6k of the received data 31d.

The electronic signature check part 82 checks the electronic signature 6e of the data 31d, and determines whether the data 31d are tampered and the valid data. Also, the electronic signature check part 82 conducts an electronic signature check in the same manner with respect to the data 33d.

In step (II), the temporary key pair generation part 83 generates the temporary server key pair 2p used to generate the temporary common key 3m. The temporary server public key 2a and the temporary server private key 2b are stored as the temporary server key pair 2p in the storage part 130a.

The temporary key pair generation part 84 creates the data 32d by encrypting, by the PKI, the temporary server public key 2a used to create the temporary common key 3m by the client terminal 5. The temporary key pair generation part 84 creates the electronic signature 7e by using the server private key 7b. The data 32d include the server public key certificate 7k indicating the server public key 7a, the temporary server public key 2a, and the electronic signature 7e created by the server private key 7b. The temporary server public key 2a is included in the message 1m. The data 32d are sent to the client terminal 5.

In step (III), when receiving the data 33d from the client terminal 5, the temporary common key generation part 85 generates the temporary common key 3m by using the temporary client public key 4a acquired from the data 33d, and the temporary server private key 2b generated by the temporary key pair generation part 83.

The decryption part 86 decrypts the current generation client public key 6a included in the message 1m of the data 33d, and reports the decrypted current generation client public key 6a to the certificate management part 92.

The certificate management part 92 confirms that the current generation client public key certificate 6k of the client terminal 5 has been registered, and confirms that the request of the next generation client public key certificate 6k' is received from the client terminal 5 times less than or equal to the invalid request count restriction for determining the invalid request. Also, when the message 1m of the data 33d does not include the next generation client public key certificate 6k', the certificate management part 92 confirms whether the next generation client public key certificate 6k' is registered in association with the current generation client public key certificate 6k.

When the above described matters are not confirmed, the certificate management part 92 has the error detection part 99 send the error termination report to the client terminal 5.

In step (IV), when the above described matters are confirmed, the certificate management part 92 issues the next generation client public key certificate 6k'. The updated certificate encryption part 87 additionally provides the electronic signature 7e to the next generation client public key certificate 6k' issued from the certificate management part 92. The electronic signature 7e to add to the next generation client public key certificate 6k' is created by the DRM, which controls and restricts use or copy of the next generation client public key certificate 6k'. The next generation client public key certificate 6k' with the electronic signature 7e is included with the private data 34s in the message 1m, is further encrypted by the PKI, so that the data 34d are created.

The data 34d include the message 1m including the server public key certificate 7k and the private data 34s, the next generation client public key certificate 6k', and the electronic signature 7e created by the server private key 7b. The data 34d are sent to the client terminal 5.

A process conducted by the error detection part 99 is the same as the process in the second example of the functional configuration depicted in FIG. 7, and the explanation thereof will be omitted.

The server 100 includes a certificate management information table 80 as depicted in FIG. 12 in order to maintain the current generation client public key certificate 6k, the next generation client public key certificate 6k', and the like. FIG. 12 is a diagram illustrating a data configuration example of the certificate management information table in the server.

In FIG. 12, the certificate management information table 80 retained in the storage part 130a of the server 100, is prepared for each of one or more client terminals 5, and includes items of "ELEMENT NUMBER", "CERTIFICATE ID", "CURRENT GENERATION CERTIFICATE FLAG", "RECEIVED COUNT", "TRANSMISSION COUNT PRIOR REPLY COMPLETION", "PUBLIC KEY", "PRIVATE KEY", "NEXT GENERATION CERTIFICATE ELEMENT NUMBER", "PREVIOUS GENERATION CERTIFICATE ELEMENT NUMBER", "VALIDITY DATE", "CLIENT PUBLIC KEY CERTIFICATE", and the like.

The item "ELEMENT NUMBER" indicates a number given to the current generation client public key certificate 6k. The item "ELEMENT NUMBER" may indicate a record number for specifying a record.

The item "CERTIFICATE ID" indicates the identification information of the client public key certificate. The "CERTIFICATE ID" may indicate a certificate publisher ID and a certificate serial number.

The item "CURRENT GENERATION CERTIFICATE FLAG" indicates whether the certificate ID represents the current generation client public key 6a. In a case of the current generation client public key 6a, the item "CURRENT GENERATION CERTIFICATE FLAG" indicates "1". In a case in that the client public key certificate is for an unused generation, the item "CURRENT GENERATION CERTIFICATE FLAG" indicates "0". Also, the initial value of the item "CURRENT GENERATION CERTIFICATE FLAG" is "0".

The item "RECEIVED COUNT" indicates a total count of requests indicating the next generation client public key certificate from the client terminal 5. The item "TRANSMISSION COUNT PRIOR REPLY COMPLETION" indicates a count, in which the server 100 receives an issuance application of the next generation client public key certificate 6k' in a state after the server 100 sends the data 34d to reply to the client terminal 5.

The item "PUBLIC KEY" indicates and stores the value (binary) of the public key, which is recorded in the encrypted state. The item "PRIVATE KEY" indicates the value (binary) of the private key, which is recorded in the encryption state.

The item "NEXT GENERATION CERTIFICATE ELEMENT NUMBER" indicates the element number of the next generation client certificate. The item "PREVIOUS GENERATION CERTIFICATE ELEMENT NUMBER" indicates the element number of the previous generation client certificate.

The item "VALIDITY DATE" indicates the date when the client public key certificate will expire, in "YYYYMMDD:hhmmss" by the Coordinated Universal Time (UTC) format. The item "CLIENT PUBLIC KEY CERTIFICATE" indicates a substance (binary) of the client public key certificate comply with X.509.

When the current generation client public key certificate 6k sent from the client terminal 5 has not been registered and is newly registered, the certificate management part 92 creates and registers a new record in the certificate management information table 80. At the registration, the certificate management part 92 sets "1" in the item "CURRENT GENERATION CERTIFICATE FLAG".

The certificate management part 92 sets a count of receiving the same current generation client public key certificate 6k, regarding the current generation client public key certificate 6k indicated by the request sent from the client terminal 5, in the item "RECEIVED COUNT" of the record of the current generation client public key certificate 6k. That is, every time the request is received from the client terminal 5, a value of the item "RECEIVED COUNT" is incremented by one in the record of the current generation client public key certificate 6k indicated by the request.

The value of the received count is referred to in a case in which the server 100 sends the next generation client public key certificate 6k' while a use count is less than or equal to a specific number.

When the request from the client terminal 5 indicates the next generation client public key certificate 6k', the certificate management part 92 issues the next generation client public key certificate 6k'. When the use count of the next generation client public key certificate 6k' indicated by the request exceeds the specific number, the certificate management part 92 of the server 100 determines that the communication with the client terminal 5 is not secured, and suppresses issuing the next generation client public key certificate 6k'.

If the next generation client public key certificate 6k' is not successfully sent and is not registered to the client terminal 5 within the specific number, the client terminal 5 is only allowed to send the request to the server 100 until the validity date of the current generation client public key certificate 6k. The client terminal 5 is not permitted to send the current generation client public key certificate 6k to the server 100 after the validity date thereof.

When the message 1m indicating the next generation client public key 6a' is received over the specific number, regarding the message 1m indicating a certain current generation client public key certificate 6k from the client terminal 5, the server 100 determines and reports that a retransmission attack message may be conducted, to the error detection part 99.

In detail, every time the message 1m as the request indicating the next generation client public key 6a' is received from the client terminal 5, the certificate management part 92 increments by one the item "TRANSMISSION COUNT PRIOR REPLY COMPLETION" of the record of the current generation client public key certificate 6k. Then, when a value of the item "TRANSMISSION COUNT PRIOR REPLY COMPLETION" exceeds the specific number, the certificate management part 92 reports it to the error detection part 99.

At the generation of the next generation client public key certificate 6k', the certificate management part 92 sets a value of the item "ELEMENT NUMBER" of the record of the next generation client public key certificate 6k' in the item "NEXT GENERATION CERTIFICATE ELEMENT NUMBER" in the record of the current generation client public key certificate 6k.

Also, the certificate management part 92 sets the value of the item "ELEMENT NUMBER" of the record of the current generation client public key certificate 6k in the item "PREVIOUS GENERATION CERTIFICATE ELEMENT NUMBER" of the record of the next generation client public key certificate 6k'.

When the following first condition is satisfied:
- the record of the current generation client public key certificate 6k sent from the client terminal 5 has been registered,
- the value "0" is set to indicate the unused generation in the item "CURRENT GENERATION CERTIFICATE FLAG" of the registered record, and
- the value "1" indicating the current generation client public key certificate 6k is set in the item "CURRENT GENERATION CERTIFICATE FLAG" of a record, which is pointed to from the item "PREVIOUS GENERATION CERTIFICATE ELEMENT NUMBER" of the registered record, the certificate management part 92 registers the value (the certificate ID) of the item "CLIENT PUBLIC KEY CERTIFICATE" to the invalidation list 2f, and deletes this record from the certificate management information table 80.

Also, the certificate management part 92 sets the value "1" representing the current generation client public key certificate 6k in the item "CURRENT GENERATION CERTIFICATE FLAG" in the record of the current generation client public key certificate 6k sent from the client terminal 5. Hence, the next generation client public key certificate 6k' is switched to the current generation client public key certificate 6k.

Also, the certificate management part 92 invalidates the client public key certificate (the certificate ID) when the following second condition is satisfied:
- the record of the current generation client public key certificate 6k sent from the client terminal 5 has been registered,
- the value "1" representing the current generation client public key certificate 6k is not set in the item "CURRENT GENERATION CERTIFICATE FLAG" of the registered record, and
- the value "1" representing the current generation client public key certificate 6k is set in the item "CURRENT GENERATION CERTIFICATE FLAG" of a record pointed by the item "NEXT GENERATION CERTIFICATE ELEMENT NUMBER" of the registered record. That is, the certificate management part 92 registers the client public key certificate (the certificate ID) in the invalidation list 2f, and deletes the record from the certificate management information table 80.

The above described second condition generally does not occur. However, the second condition may occur, when the next generation client public key certificate 6k' is switched to the current generation client public key certificate 6k, a switching process is interrupted because of some reasons, and as a result, an old current generation client public key certificate is retained in the record.

Next, steps (I) and (II) related to the sharing process 21p (FIG. 1) for sharing the temporary common key 3m between the client terminal 5 and the server 100 will be described with reference to FIG. 13 to FIG. 16.

Figure 13:
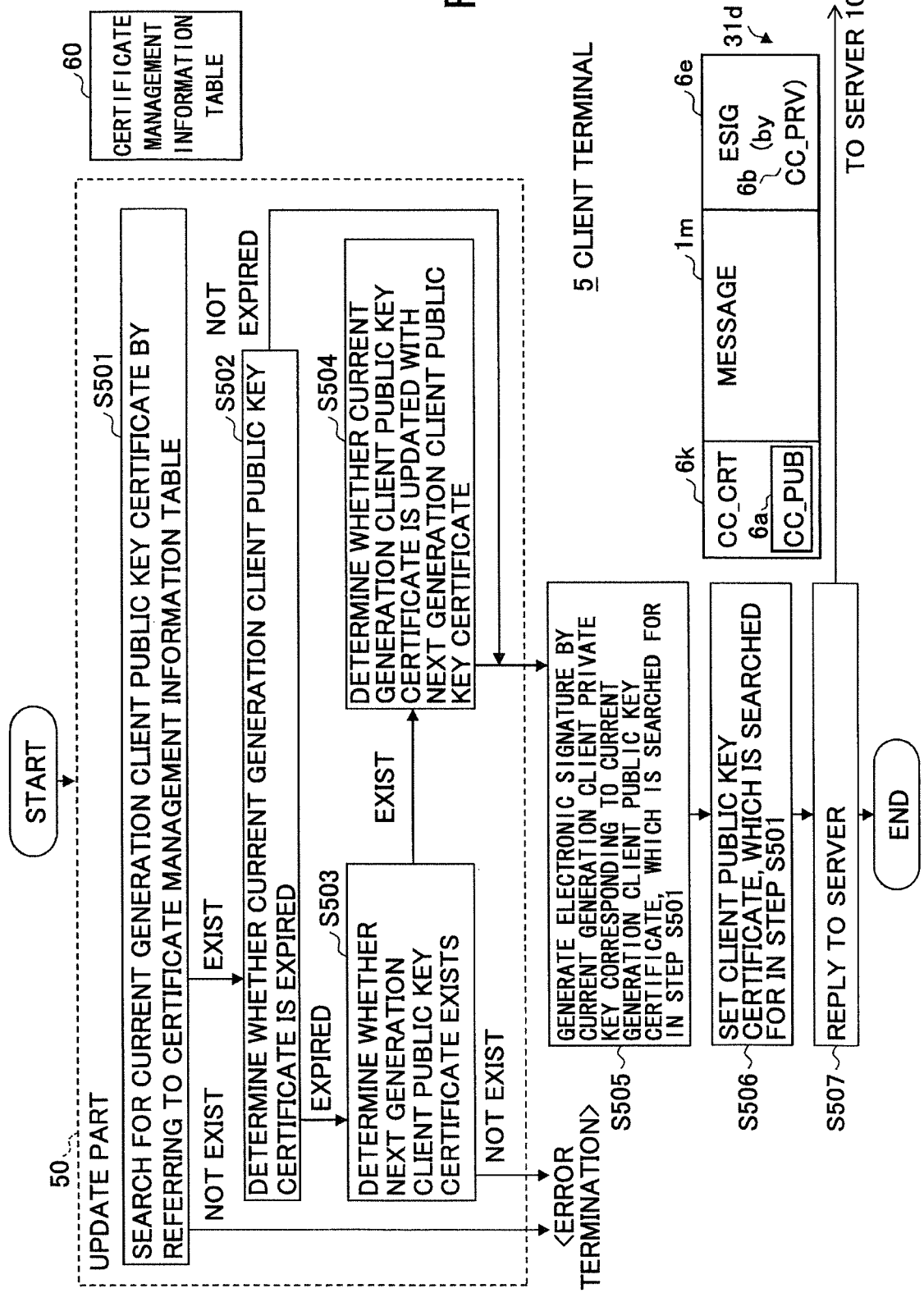
FIG. 13 is a flowchart for explaining a process in step (I) at the client terminal.

FIG. 13 is a flowchart for explaining a process in step (I) at the client terminal. In FIG. 13, the update part 50 of the client terminal 5 refers to the certificate management information table 60, and searches for the current generation client public key certificate 6k (step S501).

When the current generation client public key certificate 6k (CC_CRT) does not exist, the update part 50 conducts the error termination. On the other hand, when the current generation client public key certificate 6k exists, the update part 50 determines whether the current generation client public key certificate 6k has expired (step S502). When the current generation client public key certificate 6k has not expired, a process by the update part 50 is terminated, and the sharing process 21p advances to step S505.

On the other hand, when the current generation client public key certificate 6k has expired, the update part 50 refers to the certificate management information table 60, and determines whether the next generation client public key certificate 6k' exists (step S503). When the next generation client public key certificate 6k' does not exist, the update part 50 conducts the error termination. On the other hand, when the next generation client public key certificate 6k' exists, the update part 50 determines to update the current generation client public key certificate 6k to the next generation client public key certificate 6k' (step S504).

The electronic signature applying part 55 generates the electronic signature 6e by using the current generation client private key 6b corresponding to the current generation client public key certificate 6k retrieved in step S501, and sets the generated electronic signature 6e in the data 31d to be sent (step S505).

The electronic signature applying part 55 sets the current generation client public key certificate 6k retrieved in step S501 in the data 31d to be sent (step S506), and sends the data 31d to reply to the server 100 (step S507). The data 31d correspond to request data of the temporary server public key 2a for sharing the temporary common key 3m.

Figure 14:
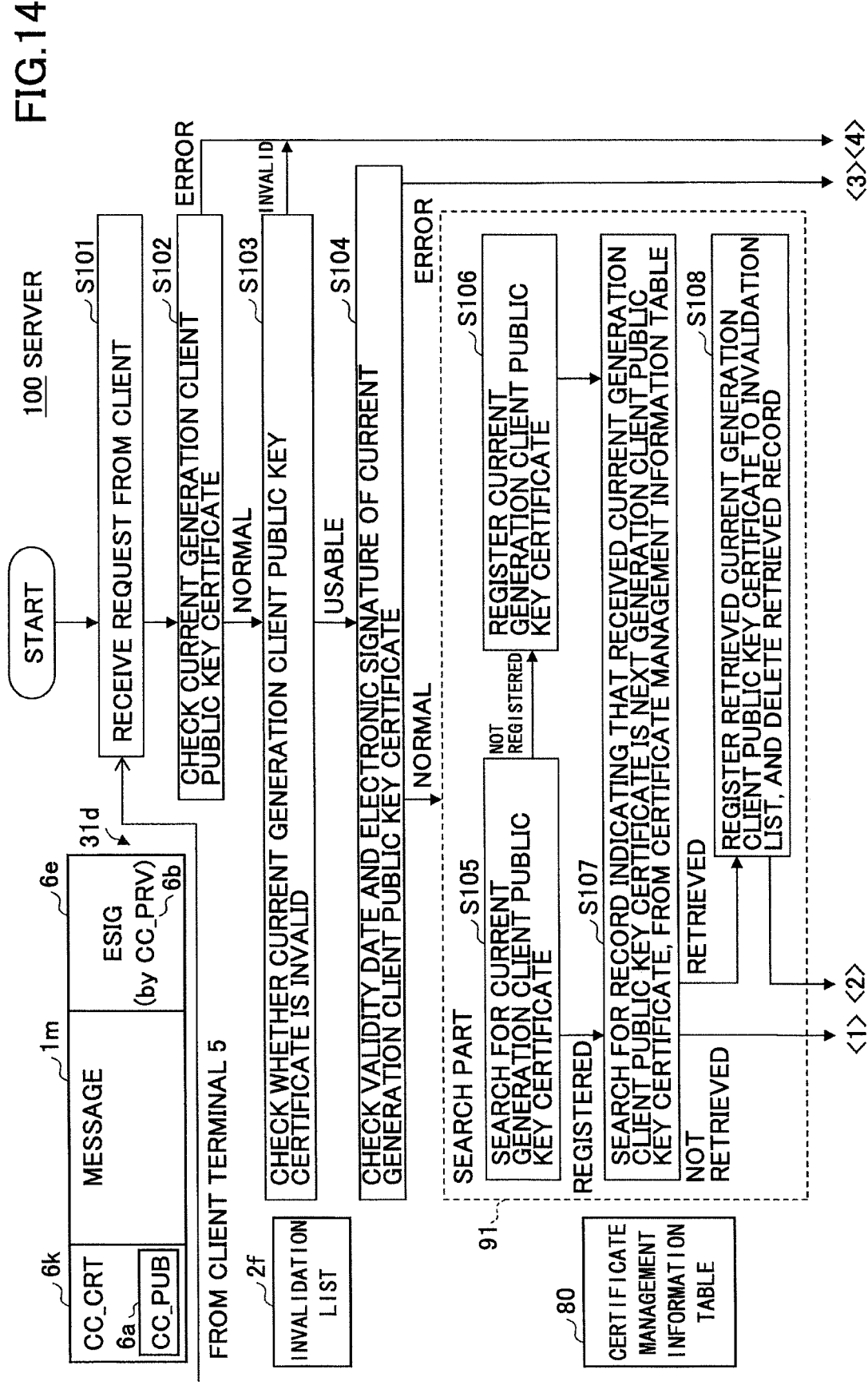
FIG. 14 is a flowchart for explaining processes in step (I) and step (II) at the server.
Figure 15:
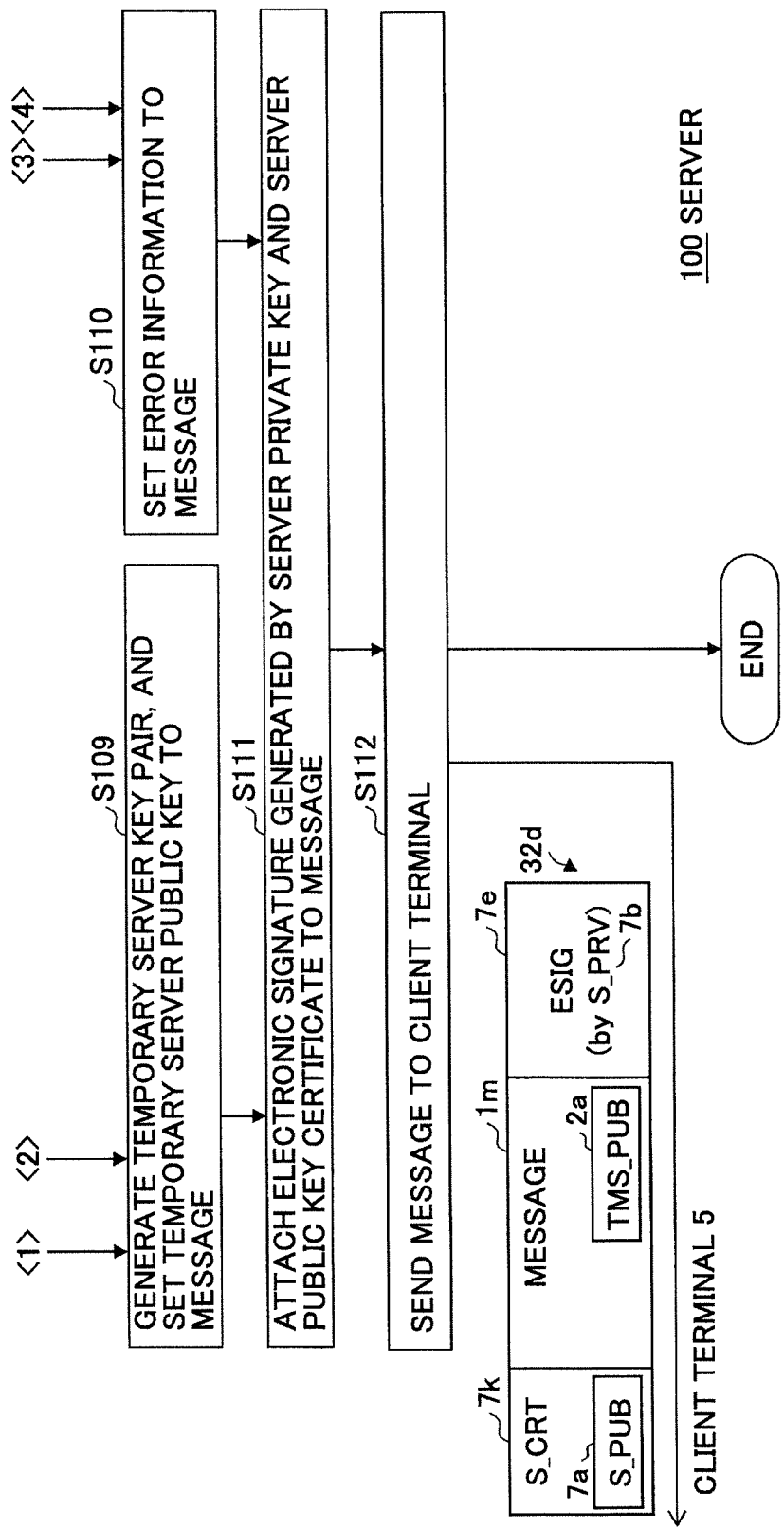
FIG. 15 is a flowchart for explaining the processes in step (I) and step (II) at the server.

FIG. 14 and FIG. 15 are flowcharts for explaining processes in step (I) and step (II) at the server. In FIG. 14, the server 100 receives the data 31d for requesting the temporary server public key 2a (step S101).

The validation confirmation part 81 determines, by using the route public key certificate 9b, whether the current generation client public key certificate 6k of the data 31d is a valid public key certificate (step S102). When a check result indicates an error, the sharing process 21p advances to step S110 in FIG. 15.

On the other hand, when the check result indicates normal, the validation confirmation part 81 further refers to the invalidation list 2f, and checks whether the current generation client public key certificate 6k is in an invalid state (step S103). When the current generation client public key certificate 6k exists in the invalidation list 2f, the validation confirmation part 81 determines that the current generation client public key certificate 6k is invalided, and reports an error to the error detection part 99. In this case, the server 100 advances to step S110 in FIG. 15.

On the other hand, when the current generation client public key certificate 6k does not exist in the invalidation list 2f, the validation confirmation part 81 determines that the current generation client public key certificate 6k has not been invalided. In this case, the electronic signature check part 82 checks the validity date and the electronic signature 6e of the current generation client public key certificate 6k (step S104). When the validity date has expired, or when a check of the electronic signature 6e does not normally end, the electronic signature check part 82 reports the error to the error detection part 99. In this case, the server 100 advances to step S110 in FIG. 15.

On the other hand, when the check of the electronic signature check part 82 normally ends, the search part 91 searches for the current generation client public key certificate 6k from the certificate management information table 80 (step S105). When the current generation client public key certificate 6k has been registered in the certificate management information table 80, the search part 91 advances to step S107.

When the current generation client public key certificate 6k has not been registered in the certificate management information table 80, the search part 91 registers the current generation client public key certificate 6k in the certificate management information table 80 (step S106), and advances to step S107.

The search part 91 searches for the record, in which the received current generation client public key certificate 6k is recorded as the next generation client public key certificate 6k' (step S107). When there is the record, a process by the search part 91 is terminated, and the server 100 advances to step S109 in FIG. 15.

On the other hand, when the record exists, the search part 91 registers the current generation client public key certificate 6k retrieved in step S105 in the invalidation list 2f, and deletes the record retrieved in step S107 (step S108).

In FIG. 15, the temporary key pair generation part 83 generates the temporary server key pair 2p, and sets the generated temporary server key pair 2p to the message 1m (step S109). Also, the temporary key pair generation part 84 adds the electronic signature 7e by using the server private key 7b and the server public key certificate 7k indicating the server public key 7a to the message 1m, and generates the data 32d by encrypting by the PKI (step S111).

After that, the data 32d are sent to the client terminal 5 (step S112). The data 32d are transmitted as reply data with respect to the data 31d corresponding to the request from the client terminal 5, from the server 100 to the client terminal 5.

A case, in which the error is reported in steps S102, S103, or S104 in FIG. 14, will be described. In FIG. 15, when receiving a report of the error, the error detection part 99 sets error information indicating contents of the error to the message 1m (step S110). For the error in step S102, the error information indicates that the validity of the current generation client public key certificate 6k is not confirmed. For the error in step S103, the error information indicates the invalidation of the current generation client public key certificate 6k. For the error in step S104, the error information indicates the expiration or that the validity of the electronic signature 6e.

The error detection part 99 instructs the temporary key pair generation part 84 to add the electronic signature 7e created by the server private key 7b and the server public key certificate 7k to the message 1m, in which the error information is set, and creates data encrypted by the PKI (step S111). After that, the error detection part 99 sends the data including the error information to the client terminal 5 (step S112).

When the client terminal 5 receives the data including the error information, the error termination report part 59 reports the error termination to the update part 50. Hence, the update part 50 acknowledges a reason of the error due to the error information.

Figure 16:
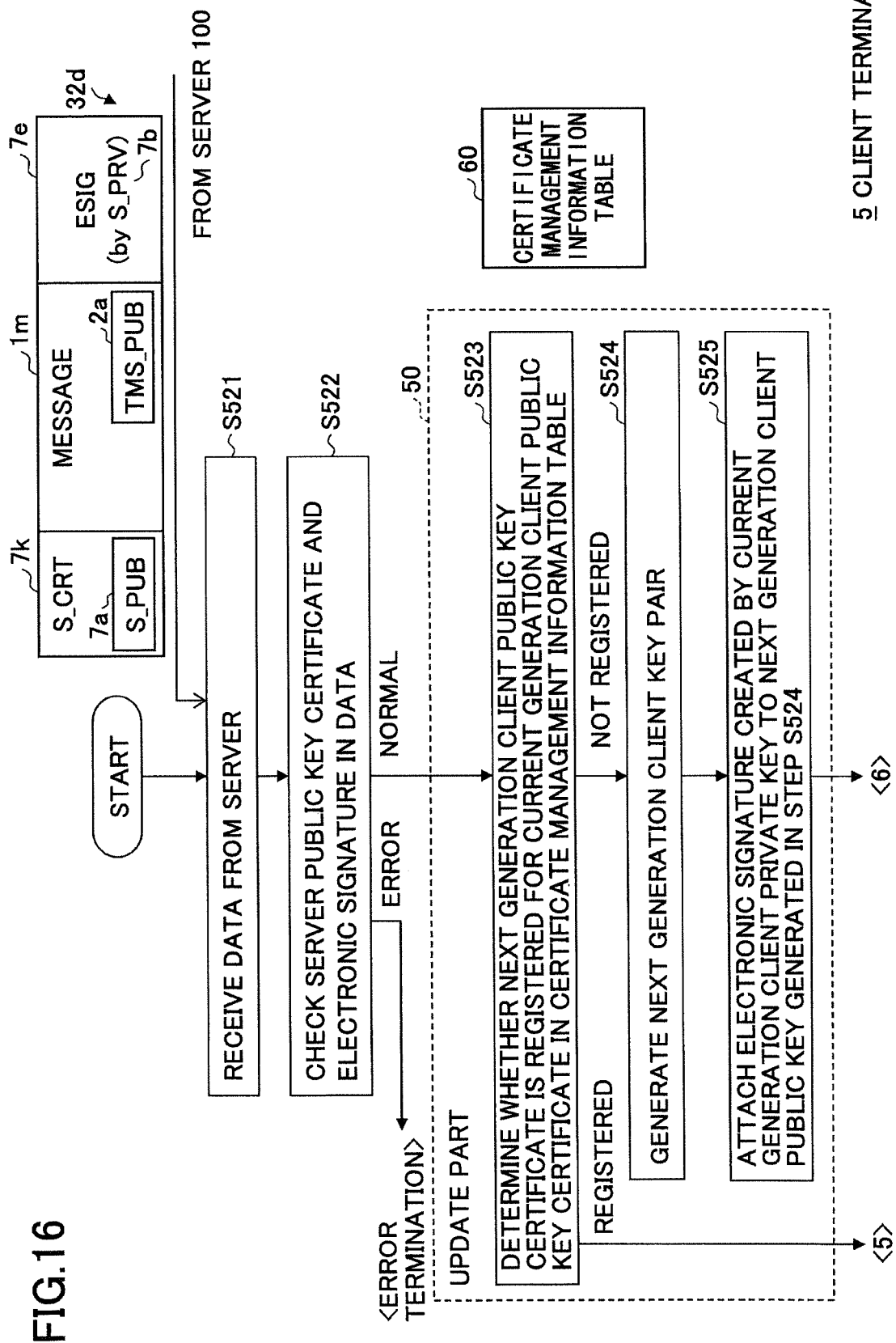
FIG. 16 is a flowchart for explaining processes in steps (II) and (III) at the client terminal.
Figure 17:
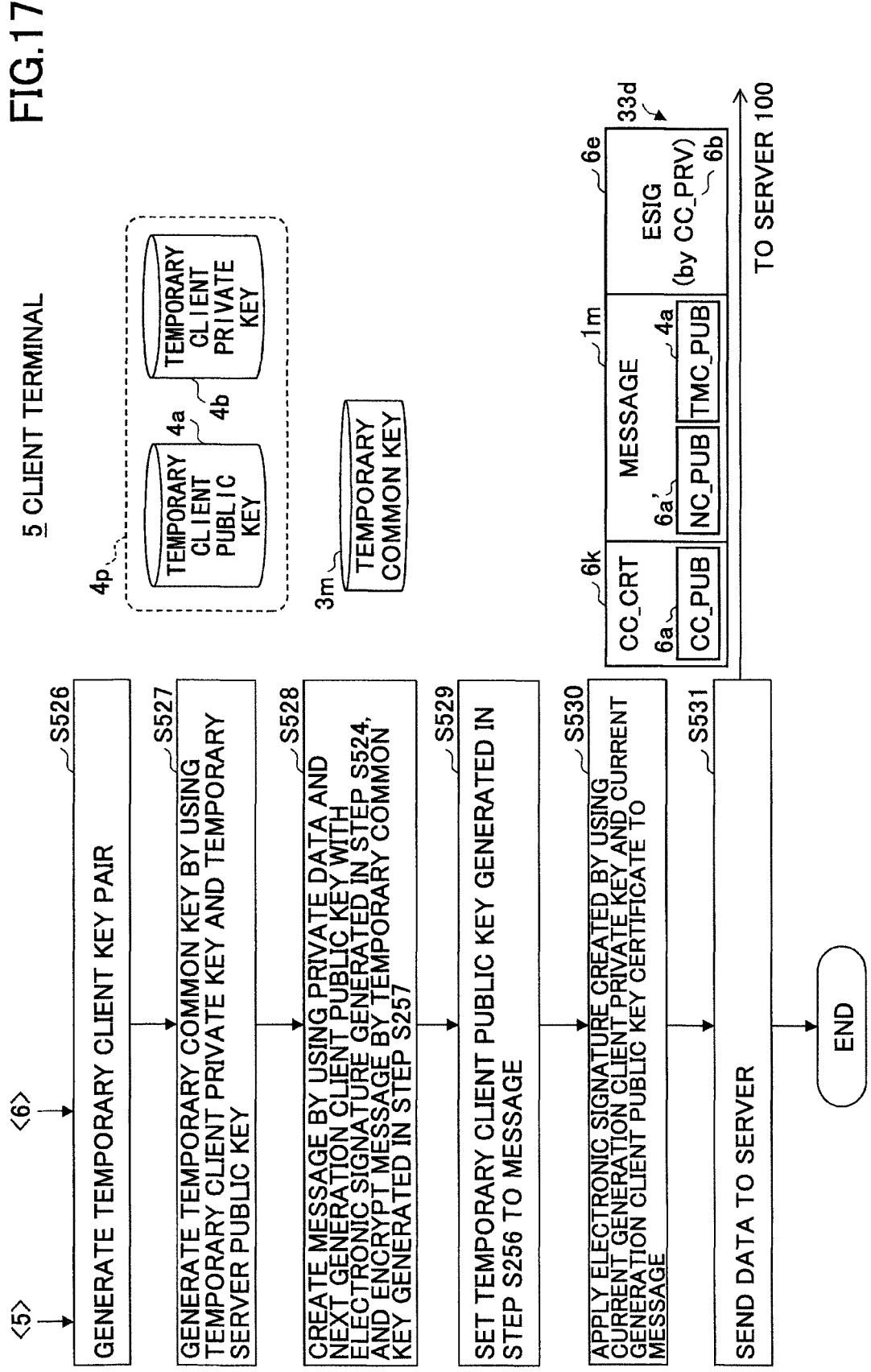
FIG. 17 is a flowchart for explaining the processes in steps (II) and (III) at the client terminal.

At the client terminal 5, when receiving the data 31d from the server 100, a process described with reference to FIG. 16 and FIG. 17 are conducted.

FIG. 16 and FIG. 17 are flowcharts for explaining processes in steps (II) and (III) at the client terminal. In FIG. 16, the client terminal 5 receives the data 32d from the server 100 (step S521).

The server validation determination part 51 checks the server public key certificate 7k and the electronic signature 7e of the data 32d received from the server 100 (step S522).

When the check result indicates the error, the server validation determination part 51 conducts the error termination.

On the other hand, when the check result indicates normal, the update part 50 determines whether the next generation client public key certificate 6k' is registered with respect to the current generation client public key certificate 6k in the certificate management information table 60 (step S523). When the next generation client public key certificate 6k' has been registered, the update part 50 advances to step S526 in FIG. 17.

When the next generation client public key certificate 6k' has not been registered, the update part 50 generates the next generation client key pair 6p' (step S524). After that, the update part 50 adds the electronic signature 6e created by using the current generation client private key 6b to the next generation client key pair 6p' generated in step S524 (step S525).

In FIG. 17, the temporary key pair generation part 52 generates the temporary client key pair 4p (step S526). Also, the temporary key pair generation part 52 generates the temporary common key 3m by using the temporary client private key 4b and the temporary server public key 2a of the data 32d received from the server 100 (step S527).

After that, the encryption part 54 creates the message 1m by the private data 33s and the next generation client public key 6a' with the electronic signature 6e generated in step S254, and encrypts the temporary common key 3m generated in step S257 (step S528). The encryption part 54 sets the temporary client public key 4a generated in step S256 to the message 1m (step S529).

Next, the electronic signature applying part 55 generates the data 33d by adding the electronic signature 6e created by the current generation client private key 6b and the current generation client public key 6a to the message 1m (step S530). Hence, the data 33d are sent from the client terminal 5 to the server 100. The data 33d correspond to the request data for acquiring the next generation client public key certificate 6k'.

Figure 18:
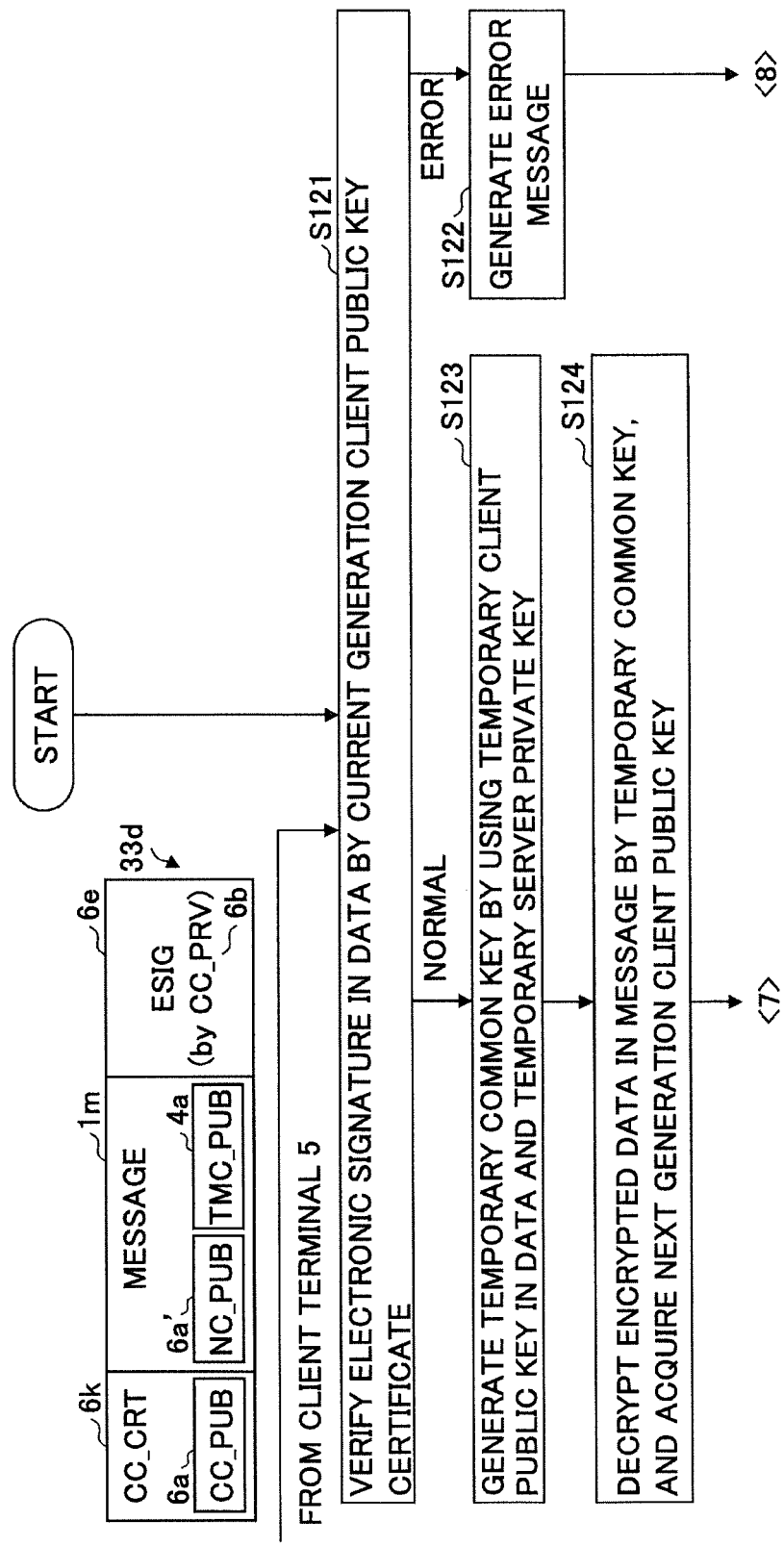
FIG. 18 is a flowchart for explaining processes in steps (III) and (IV) at the server.
Figure 19:
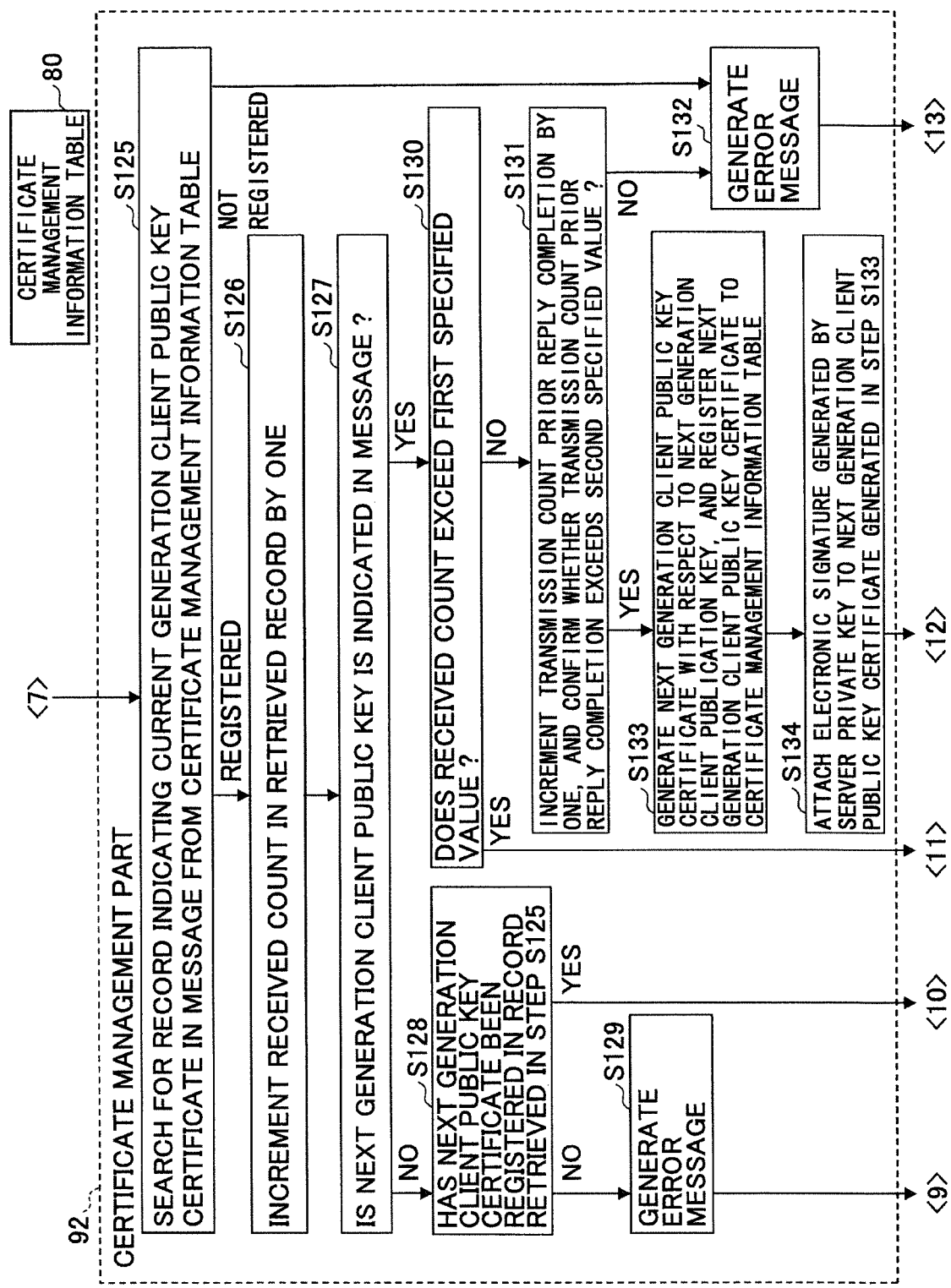
FIG. 19 is a flowchart for explaining the processes in steps (III) and (IV) at the server.
Figure 20:
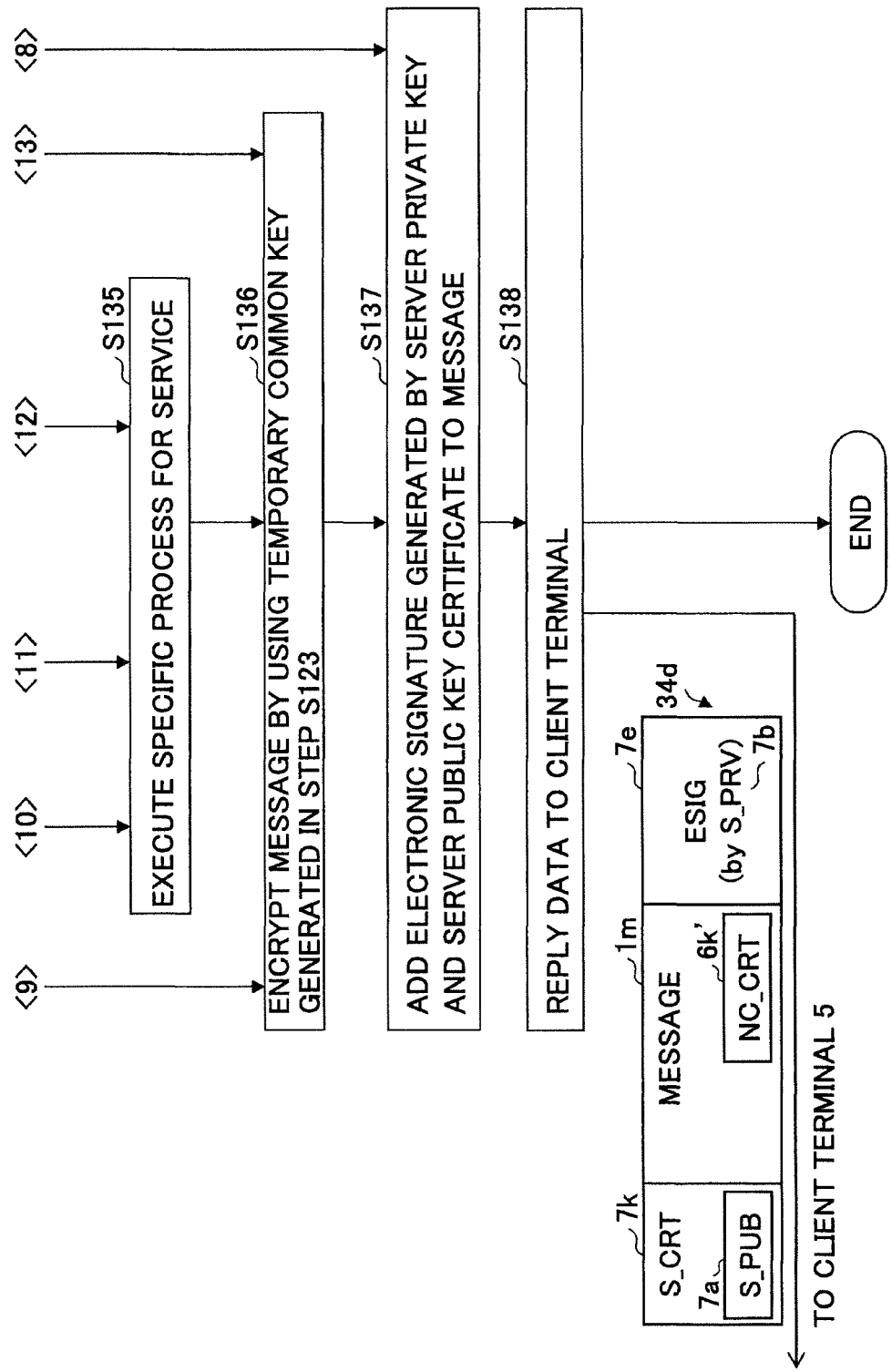
FIG. 20 is a flowchart for explaining the processes in steps (III) and (IV) at the server.

FIG. 18, FIG. 19, and FIG. 20 are flowcharts for explaining processes in steps (III) and (IV) at the server. In FIG. 18, after the server 100 receives the data 33d from the client terminal 5, and confirms, by the validation confirmation part 81, the validity of the current generation client public key certificate 6k, the decryption part 86 verifies the electronic signature 6e of the received data 33d by using the current generation client public key certificate 6k (step S121). When a verification result indicates the error, the decryption part 86 generates an error message (step S122). The server 100 advances to step S137 in FIG. 20.

On the other hand, when the verification result indicates normal, the temporary common key generation part 85 generates the temporary common key 3m by using the temporary client key pair 4p acquired from the data 33d and the server key pair 7p (step S123).

The decryption part 86 decrypts encrypted data in the message 1m of the data 33d by using the temporary common key 3m, and acquires the next generation client public key 6a' (step S124).

In FIG. 19, the certificate management part 92 searches for the record indicating the current generation client public key certificate 6k in the message 1m in the data 33d from the certificate management information table 80 (step S125). The record, of which the item "CERTIFICATE ID" matches the current generation client public key certificate 6k in the message 1m, is searched for. The certificate management part 92 increments the received count of the retrieved record by one (step S126).

After that, the certificate management part 92 confirms whether the next generation client public key 6a' is indicated in the message 1m (step S127). When the next generation client public key 6a' is indicated, the certificate management part 92 determines whether the next generation client public key certificate 6k' is registered in the record retrieved in step S125 (step S128).

When the next generation client public key certificate 6k' has not been registered, the certificate management part 92 generates the error message (step S129). The server 100 advances to step S136 in FIG. 20. In this case, the error message corresponds to the message 1m. However, when the next generation client public key certificate 6k' has been registered, the server 100 advances to step S135 in FIG. 20.

In step S127, when the next generation client public key 6a' is indicated in the message 1m, the certificate management part 92 determines whether the value of the item "RECEIVED COUNT" of the record retrieved in step S125 exceeds a specific value (step S130). When the value of the item "RECEIVED COUNT" exceeds the specific value, the server 100 advances to step S135 in FIG. 20.

On the other hand, when the value of the item "RECEIVED COUNT" of the record retrieved in step S125 does not exceed the specific value, the certificate management part 92 increments the item "TRANSMISSION COUNT PRIOR REPLY COMPLETION" of the record retrieved in step S125 by one, and determines whether that value exceeds the specific value (step S131). When that value exceeds the specific value, that is, when the value of the item "TRANSMISSION COUNT PRIOR REPLY COMPLETION" is outside of an allowable range, the certificate management part 92 generates the error message (step S132). The server 100 advances to step S136 in FIG. 20. In this case, the error message corresponds to the message 1m.

On the other hand, when the value of the item "TRANSMISSION COUNT PRIOR REPLY COMPLETION" is less than or equal to the specific value, that is, when the item "TRANSMISSION COUNT PRIOR REPLY COMPLETION" indicates the value within the allowable range, the certificate management part 92 generates the next generation client public key certificate 6k' with respect to the next generation client public key 6a', and registers the certificate management information table 80 (step S133).

After that, the certificate management part 92 adds the electronic signature 7e created by using the server private key 7b to the next generation client public key certificate 6k' generated in step S133, and sets the next generation client public key certificate 6k' to the message 1m (step S134). The server 100 advances to step S135 in FIG. 20.

In FIG. 20, following YES of step S128, YES of step S130, or step S134 conducted by the certificate management part 92, the server 100 performs a process a service specific process (step S135). A result of the service specific process corresponds to the private data 34s. The private data 34s is set to the message 1m.

The updated certificate encryption part 87 encrypts the message 1m acquired in step S129, step S132, or step S135, by using the temporary common key 3m (step S136).

Furthermore, the updated certificate encryption part 87 creates the data 34d by adding the electronic signature 7e created by using the server private key 7b and the server public key certificate 7k to the encrypted message 1m (step S137). The updated certificate encryption part 87 sends the created data 34d to the client terminal 5 (step S138). When the error message is sent to the client terminal 5, the message 1*m* of the data 34*d* does not include the next generation client public key certificate 6*k'*.

Figure 21:
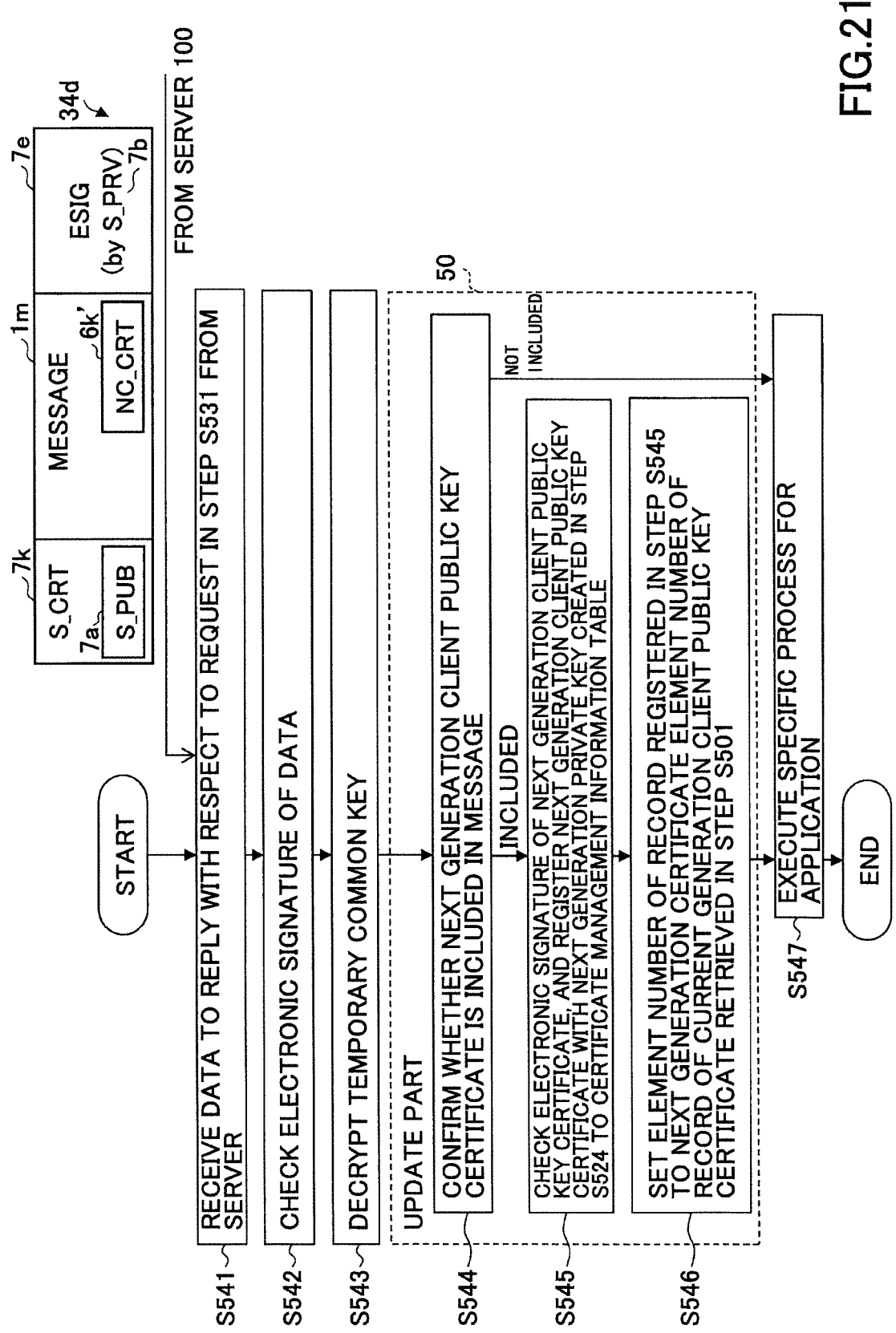
FIG. 21 is a flowchart for explaining the process in step (IV) at the client terminal.

FIG. 21 is a flowchart for explaining the process in step (IV) at the client terminal. In FIG. 21, the client terminal 5 receives the data 34*d* replied from the server 100 with respect to the request in step S531 (FIG. 17) (step S541).

The electronic signature check part 56 checks the electronic signature 7*e* of the data 34*d* (step S542). The decryption part 57 decrypts the message 1*m* of the data 34*d* by the temporary common key 3*m* (step S543).

Next, the update part 50 confirms whether the next generation client public key certificate 6*k'* exists in the message 1*m* of the data 34*d* (step S544). When the next generation client public key certificate 6*k'* does not exist, the client terminal 5 performs a process specific to an application (step S547).

On the other hand, when the next generation client public key certificate 6*k'* exists, the update part 50 checks the electronic signature 6*e* of the next generation client public key certificate 6*k'*, and registers the next generation client public key certificate 6*k'* with the next generation client private key 6*b'* created in step S524 to the certificate management information table 60 (step S545).

After that, the update part 50 sets the element number of a record registered in step S545 in the item "NEXT GENERATION CERTIFICATE ELEMENT NUMBER" of the record of the current generation client public key certificate 6*k* retrieved in step S501 (step S546).

Next, a comparison will be described between a related art case and the embodiment. In the related art, the same current generation client public key certificate 6*k* is in use for a long term. In the embodiment, the client public key certificate is capable of being securely updated in a short term.

FIG. 22A illustrates a case of the related art. FIG. 22B illustrates a case of the embodiment. In FIG. 22A and FIG. 22B, a right direction represents a length of progressing time.

In FIG. 22A, a risk is described in the related art using a client public key certificate 1*k* approximately over one decade. Referring to FIG. 22A, at time T0, the client public key certificate 1*k* is started to be used.

From time T1, a third party begins to estimate a client secret key 1*b* of the client public key certificate 1*k*. The third party may intercept communication multiple times, and may be estimating the client private key 1*b* for a long term. Then, the third party may successfully estimate the client private key 1*b* at time T25. As a result, the third party estimates the client public key certificate 1*k* and the client public key 1*a*.

The third party may disguise itself as the client terminal 5 by using the client public key certificate 1*k*, which is successfully estimated, and may illegally use the private data 34*s* of the client terminal 5.

Since it is difficult for the user of the client terminal 5 and an administrator of the server 100 to detect the identity theft, the third party may continuously and illegally use the private data 34*s* of the client terminal 5.

In FIG. 22B, the risk is described in the embodiment, in which the current generation client public key certificate 6*k* is updated in a sufficient shorter term than a long term possible to successfully estimate the current generation client public key certificate 6*k*. In FIG. 22B, an update example from a first generation to a fourth generation will be described.

Referring to FIG. 22B, at time T0, the client terminal 5 starts to use a first generation client public key certificate 61*k* by using the client private key 61*b*. From time T2, the third party starts to intercept and estimate the client private key 61*b*.

In response to a request from the client terminal 5 at a start time (time T0) to use the first generation client public key certificate 61*k*, a second client public key certificate 62*k* for the update is transmitted by being encrypted by using a temporary common key 31*m* from the server 100. At time T3, the third party intercepts and estimates the temporary common key 31*m*.

At time T20 prior to the time T25 when the third party may estimate, the client terminal 5 switches to a second generation client public key certificate 62*k*, which was acquired beforehand. Accordingly, the third party fails to estimate the first generation client private key 61*b*.

At time T20, the client terminal 5 updates from the first generation client public key certificate 61*k* to the second generation client public key certificate 62*k*. By starting to use the second generation client public key certificate 62*k*, the third party may give up estimating the temporary common key 31*m*.

In response to a request from the client terminal 5 at a start time (time T20) of using the second generation client public key certificate 62*k*, a third generation client public key certificate 63*k* for the update is transmitted from the server by being encrypted by a temporary common key 32*m*. From time T23, the third party intercepts and estimates the temporary common key 32*m*.

At time T30, the client terminal 5 switches to a third generation client public key certificate 63*k*, which was acquired beforehand. Accordingly, the third party fails to estimate the second generation client private key 62*b*.

At time T30, the client terminal 5 updates from the second generation client public key certificate 62*k* to the third generation client public key certificate 63*k*, and starts to use the third generation client public key certificate 63*k*. Hence, the third party may give up estimating the temporary common key 32*m*.

In response to the request from the client terminal 5 at a start time (time T30) of the third generation public key certificate 63*k*, a fourth generation public key certificate 64*k* for the update is transmitted from the server 100 by being encrypted by using a temporary common key 33*m*. The third party intercepts and estimates the temporary common key 33*m*.

At time T40, the client terminal 5 switches to the fourth generation public key certificate 64*k*, which was acquired beforehand. Accordingly, the third party fails to estimate the third generation client private key 63*b*.

At time T40, the client terminal 5 updates from the third generation client private key 63*b* to the fourth generation public key certificate 64*k*, and starts to use the fourth generation public key certificate 64*k*. Hence, the third party may give up estimating the temporary common key 33*m*.

As described above, before cipher-breaking is conducted by the third party, the client public key certificate is updated by the temporary common key, so that it is possible to realize secure communications.

Also, in the embodiment, an encryption key and a decryption key special for updating the client public key certificate are not retained during a term when a service is available by the server 100. Accordingly, it is possible to prevent an illegal action by the identity theft of the client terminal 5.

Furthermore, generations of the temporary client key pair 4*p* and the temporary server key pair 2*p* and a generation of the temporary common key 3*m* are conducted without user's operations. Hence, each update is carried out without giving any burden to a user.

In the embodiment, the next generation client public key certificate 6*k'* is updated at the server 100 for a mutual authentication between the client terminal 5 and the server 100. Hence, a part of or the entire client terminal 5 need not be replaced.

Also, the next generation client key pair 6*p'* is generated in the client terminal 5. With respect to the client terminal 5, the next generation client public key certificate 6*k'* and the next generation client private key 6*b'* are not remotely updated for the mutual authentication. It is possible to reduce the risk of intercepting the next generation client private key 6*b'*.

Accordingly, a long term attack becomes pointless for the current generation client public key 6*a*, and it is possible to prevent the illegal action such as the identity theft of the client terminal 5 by the third party.

In the embodiment, the server 100 issues the next generation client public key certificate 6*k'*. It is possible to make the term of the next generation client public key certificate 6*k'* shorter than before. Hence, it is possible to significantly reduce the risk of estimating the current generation client private key 6*b*.

First, in the embodiment, in order to counter the long term estimation of the current generation client public key certificate 6*k*, the next generation client public key certificate 6*k'* is securely sent to the client terminal 5 from the server 100 rather early after the current generation client public key certificate 6*k* is used at a timing when the current generation client public key certificate 6*k* is sent from the client terminal 5 to the server 100.

A term of sending the next generation client public key certificate 6*k'* from the server 100 to the client terminal 5 may be used as a parameter by the server 100. By the parameter, a date and time after predetermined months may be indicated.

When the term of the current generation client public key certificate 6*k* has come, the client terminal 5 switches from the current generation client public key certificate 6*k* to the next generation client public key certificate 6*k'*. Rather early from time when the next generation client public key certificate 6*k'* is first used, a further next generation client public key certificate is securely sent as a reply to the client terminal 5. Hence, before the current generation client public key 6*a* is estimated by the third party, it is possible to switch to the next generation client public key 6*a'*.

Second, with respect to an action intercepting the reply of the next generation client public key certificate 6*k'* from the server 100, the "TRANSMISSION COUNT PRIOR REPLY COMPLETION" by the client terminal 5 is counted in a state in which the reply from the server 100 has not reached the client terminal 5. When the specific value determined beforehand exceeds the specific value, the server 100 controls so that the next generation client public key certificate 6*k'* is invalided, and a request using the next generation client public key certificate 6*k'* is rejected. Hence, it is possible to counter the illegal analysis.

Accordingly, it is possible to securely update a pair of the public key certificate and the private key, which are special to the client terminal 5.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an update program that causes a computer to execute a process comprising:
sending an issuing request of a second public key certificate to a server in response to a connection to the server at an initial use of a first public key certificate, to which a validity date is attached;
receiving the second public key certificate from the server;
storing the second public key certificate in a storage part; and
conducting a connection confirmation using the second public key certificate in a shorter term than the first public key certificate is to be estimated in a secure communication using the first public key certificate prior to the validity date after receiving the second public key certificate.

2. The non-transitory computer-readable recording medium according to claim 1, further comprising:
sharing a temporary common key with the server by the secure connection; and
encrypting a second public key corresponding to the second public key certificate by using the temporary common key shared with the server, so that the issuing request is sent to the server with the encrypted second public key certificate.

3. The non-transitory computer-readable recording medium according to claim 1, wherein the issuing request is conducted at a timing of sending the first public key certificate to the server.

4. The non-transitory computer-readable recording medium according to claim 2, further comprising:
generating a temporary client key pair to temporally use; and
generating the temporary common key by using a temporary client private key of the generated temporary client key pair and a temporary server public key acquired from the server beforehand.

5. The non-transitory computer-readable recording medium according to claim 2, further comprising:
generating a second key pair of the second public key and a second private key; and
applying an electronic signature by using a first private key corresponding to the first public key certificate with respect to the generated second public key.

6. The non-transitory computer-readable recording medium according to claim 1, further comprising confirming a connection using the second public key certificate stored in the storage part in response to a rejection of the first public key certificate made by the server.

7. An update method performed by a computer, comprising:
sending an issuing request of a second public key certificate to a server in response to a connection to the server at an initial use of a first public key certificate, to which a validity date is attached;
receiving the second public key certificate from the server;

storing the second pubic key certificate in a storage part; and conducting a connection confirmation using the second public key certificate in a shorter term than the first public key certificate is to be estimated in a secure communication using the first public key certificate prior to the validity date after receiving the second public key certificate.

8. A non-transitory computer-readable recording medium storing therein a management program for multiple public key certificates used to confirm a validity of a client terminal sending request data and the validity of the request data, the management program causing a computer to execute a process comprising:

sharing a temporary common key with the client terminal in response to a connection to the client terminal at an initial use of a first public key certificate, to which a validity date is attached;

generating a second public key certificate with respect to an issuing request of the second public key certificate from the client terminal;

encrypting the second public key certificate by using the temporary common key; and sending the encrypted second public key certificate to the client terminal; and setting the second public key certificate as the first public key certificate upon a connection confirmation from the client terminal using the second public key certificate in a shorter term than the first public key certificate is to be estimated in a secure communication using the first public key certificate prior to the validity date after receiving the second public key certificate, wherein the first public key certificate remains valid during the validity date in a communication connection to the client terminal.

9. The non-transitory computer-readable recording medium according to claim 8, further comprising:

storing, in a table, the first public key certificate and the second public key certificate used to update the first public key certificate for each of terminal clients so that the second public key certificate is associated with the first public key certificate in the table.

10. The non-transitory computer-readable recording medium according to claim 8, further comprising:

counting the issuing request; and determining that the issuing request is an illegal request and detecting an error, when a count of the issuing request exceeds a specific value.

11. The non-transitory computer-readable recording medium according to claim 8, further comprising:

generating a temporary server key pair for temporary use; and generating a temporary server private key of the generated temporary server key pair and a temporary client public key acquired beforehand from the client terminal.

12. The non-transitory computer-readable recording medium according to claim 8, further comprising:

receiving an encrypted second public key for the second public key certificate from the client terminal;

decrypting the second public key by using the temporary common key; and generating the second public key certificate with respect to the decrypted second public key.

13. A management method performed by a computer to maintain multiple public key certificates used to confirm a validity of a client terminal sending request data and the validity of the request data, the management method comprising:

sharing a temporary common key with the client terminal in response to a connection to the client terminal at an initial use of a first public key certificate, to which a validity date is attached;

generating a second public key certificate with respect to an issuing request of the second public key certificate from the client terminal;

encrypting the second public key certificate by using the temporary common key;

sending the encrypted second public key certificate to the client terminal; and setting the second public key certificate as the first public key certificate upon a connection confirmation from the client terminal using the second public key certificate in a shorter term than the first public key certificate is to be estimated in a secure communication using the first public key certificate prior to the validity date after receiving the second public key certificate, wherein the first public key certificate remains valid during the validity date in a communication connection to the client terminal.

* * * * *